(12) United States Patent
Drozhilkin et al.

(10) Patent No.: US 11,785,137 B2
(45) Date of Patent: Oct. 10, 2023

(54) VOICE COMMUNICATION SYSTEM AND METHOD FOR PROVIDING CALL SESSIONS BETWEEN PERSONAL COMMUNICATION DEVICES OF CALLER USERS AND RECIPIENT USERS

(71) Applicant: Echo SmartLab GmbH, Kusnacht (CH)

(72) Inventors: Sergei Vladimirovich Drozhilkin, Kuesnacht (CH); Vladimir Ponomarev, Monaco (MC); Nikolay Nikolaevich Mikhaylov, Nizhny Novgorod (RU)

(73) Assignee: ECHO SMARTLAB GMBH, Kusnacht (CH)

( * ) Notice: Subject to any disclaimer, the term of this patent is extended or adjusted under 35 U.S.C. 154(b) by 211 days.

(21) Appl. No.: 17/468,189

(22) Filed: Sep. 7, 2021

(65) Prior Publication Data
US 2023/0071159 A1 Mar. 9, 2023

(51) Int. Cl.
*H04M 3/42* (2006.01)
*G10L 15/07* (2013.01)
*G10L 15/18* (2013.01)
*G10L 15/187* (2013.01)
*H04M 1/64* (2006.01)
*G10L 15/22* (2006.01)

(52) U.S. Cl.
CPC ......... *H04M 3/42042* (2013.01); *G10L 15/07* (2013.01); *G10L 15/187* (2013.01); *G10L 15/1815* (2013.01); *H04M 1/64* (2013.01); *G10L 2015/223* (2013.01); *H04M 2201/40* (2013.01); *H04M 2201/41* (2013.01)

(58) Field of Classification Search
CPC . H04M 3/42042; G10L 15/07; G10L 15/1815
USPC ........................................................ 455/415
See application file for complete search history.

(56) References Cited

U.S. PATENT DOCUMENTS

| | | | |
|---|---|---|---|
| 6,035,217 A | 3/2000 | Kravitz | |
| 6,892,083 B2 | 5/2005 | Shostak | |
| 9,270,931 B2 | 2/2016 | Frankel et al. | |
| 10,235,129 B1 * | 3/2019 | Carlson | H04M 3/563 |

(Continued)

*Primary Examiner* — Jirapon Tulop
(74) *Attorney, Agent, or Firm* — Browdy and Neimark, PLLC

(57) ABSTRACT

A system and method for providing call sessions between personal communication devices (PCDs) of sender users and recipient users are described. The system includes one or more voice communication domains (VCDs) interacting with each other, and a cross-domain coordinator configured to coordinate interaction between the voice communication domains over the Global Communication Network. Each VCD includes PCDs associated with the corresponding users, and a voice communication server (VCS) deployed within the voice communication domain. The VCS is configured to control operation of the PCDs verbally by user voice commands, and to provide call sessions between a sender user and a recipient user within the same voice communication domain and between the users of different voice communication domains. Initiation of the call sessions can be carried out either by voice commands to the VCS of the system, or by delivering a voice call proposal of the caller user for voice communication directly to the recipient in a natural manner.

29 Claims, 18 Drawing Sheets

(56) References Cited

U.S. PATENT DOCUMENTS

| | | |
|---|---|---|
| 10,735,597 B1 | 8/2020 | Zagorski et al. |
| 10,735,598 B2 | 8/2020 | Ponomarev et al. |
| 11,228,624 B1 * | 1/2022 | Oueslati .............. H04L 65/1069 |
| 2008/0256209 A1 | 10/2008 | Carro |
| 2010/0124218 A1 | 5/2010 | Bredikhn et al. |
| 2018/0061402 A1 | 3/2018 | Devaraj et al. |
| 2018/0068317 A1 | 3/2018 | Gilbey et al. |
| 2018/0124225 A1 | 5/2018 | Boesen et al. |
| 2020/0112639 A1 | 4/2020 | Ponomarev et al. |

* cited by examiner

VOICE COMMUNICATION SYSTEM AND METHOD FOR PROVIDING CALL SESSIONS BETWEEN PERSONAL COMMUNICATION DEVICES OF CALLER USERS AND RECIPIENT USERS

TECHNOLOGICAL FIELD

This invention relates to the field of voice communication systems, and in particular to a system and method for providing call sessions between personal communication devices of users over communication networks.

BACKGROUND

Wireless communication makes it possible to connect people everywhere. Today, wireless communication devices, such as mobile phones, have become almost indispensable for people on the road, at home and at work. The majority of mobile phone users today use smartphones, which are rather sophisticated mobile phone devices that enable the users not only to place and receive phone calls and text messages, but which also provide features that are more advanced. However, smartphones are not easy or simple to use for a large segment of the population. For example, placing a call through a cellular communication device can still present a daunting task for young children, aged people, and especially for the physically and/or mentally disabled. This may be especially true for the children who do not yet recognize numbers on the dialing keypad or the functions of the buttons on a smartphone. Likewise, an aged person suffering from eye maladies may not be able to dial a number by sight.

In order to overcome many drawbacks of the current smartphones U.S. Pat. No. 10,735,598 to Ponomarev at al describes a system and method for voice communication between sender users and recipient users over communication networks. As shown in FIG. 1, the system includes a plurality of voice communication domains 1 interacting with each other, and a cross-domain coordinator 3 configured to coordinate interaction between the voice communication domains 1 over the Global Communication Network (GCN) 2. Each voice communication domain 1 includes a plurality of personal communication devices (PCDs) 12 associated with the corresponding users 11, and a voice communication server 13 deployed within the voice communication domain 1 to control operation of the PCDs 12. Each PCD 12 is controlled and operated by voice user commands provided verbally, and is configured to provide voice communication between a sender user and a recipient user within the same voice communication domain 1, and between the users of different voice communication domains.

This technique provides voice communications between users by using a miniature, lightweight and convenient personal communication device, that can be wearable by users, for example, by attaching them to clothing. Such personal communication devices can provide many features of sophisticated smartphones, but, at the same time, they can be easily used by people of all ages, conditions, and technical experience. The voice communications provided by the system of U.S. Pat. No. 10,735,598 can be controlled and operated by voice dialogues of the users with the system by using their personal communication devices. The voice dialogues are interpreted by the voice communication system as instructions for particular actions.

In operation, in order to establish a voice communication, a caller user 11 pronounces to his personal communication device 12 a voice command selected from a predetermined list. Such a voice command is indicative of the caller user's instruction to establish a voice call with another user (recipient user) of the voice communication system. The voice command includes at least one personality characteristic of the target recipient user (e.g. recipient's user name). The personal communication device 12 generates an encoded voice information signal carrying the voice command, and transmits the generated encoded voice information signal to the voice communication server 13. The voice communication server 13, in its turn, analyses the voice command of the caller user, and finds the personal communication device 12 of the target recipient user by using one or more personality characteristics of the recipient included in the voice command. After finding of the personal communication device 12 of the recipient user in the same domain 1 of the caller user, the voice communication server 13 establishes a call session between the personal communication devices of the caller and recipient users by sending a ringing notification signal to the personal communication device of the recipient user, and providing full-duplex exchange of the voice communication signals between the personal communication devices of the caller and recipient users via the voice communication server 13 over the domain communication network. On the other hand, if the personal communication device of the recipient user is not found in the domain of the caller user, the system allows to search the recipient user in the other domain, and, upon finding the user, to establish a corresponding cross-domain call session.

SUMMARY

It would be beneficial to have a communication system for providing call sessions between personal communication devices of a caller user and a recipient user, not only by voice commands to the voice communication server of the system from an instruction name list including predetermined control instructions assigned for the system, but also by delivering a voice call proposal of the caller user directly to the recipient user in a natural way, i.e., in the same manner, as if the recipient is located nearby, at arm's distance.

Likewise, it would also be advantageous that the recipient user could respond to the call proposal in a natural manner by voice response.

It would be further advantageous if the system could automatically handle all actions and requirements, which are necessary for establishment of a remote full-duplex call session between the caller and recipient users communicating by using the system.

One of the advantages of such initiation of the call session by the call proposal over the initiation of the call session by providing voice command to the system to call to a recipient user is in the fact that it can be more friendly and easily used by people of all ages, conditions, and technical experience.

In the present description and in the claims, the personal communication device of the caller user is also referred to as the "caller personal communication device", or as the "caller PCD". In turn, the personal communication device of the recipient user is also referred to as the "recipient personal communication device", or as the "recipient PCD". It should be understood that the same user of the personal communication device can be either a caller user (when he/she initiates a call) or a recipient user (when he/she receives the call).

According to an embodiment of the present invention, a caller user has two options to initiate a voice communication with another recipient user.

In the first option, a call session between the caller user and the target recipient user can be initiated by a voice command, which is addressed to the voice communication system. In operation, the caller user utters the voice command to the system in natural language into his personal communication device. The voice command includes a phrase, which is indicative of a control instruction to establish voice communication with the target recipient user.

During execution of the voice command, the system finds the personal communication device of the target recipient user within the voice communication system, and transmits a ringing notification signal to this personal communication device. The ringing notification is then played to the recipient user so as to inform the recipient user about the incoming call. Should the recipient user accept the incoming call, the call session between the personal communication devices of the caller and the recipient user is established.

The control instruction, represented by the phrase of the voice command, includes an instruction name and instruction parameters associated with the control instruction. A call session can, for example, be initiated by the following control instruction provided verbally within a voice command by a caller user: "Call to Bill Morrison", where a phrase element "Call" is an instruction name denoting that establishing of the call session is required. In turn, the phrase element "Bill Morrison" is an instruction parameter, associated with the given control instruction. The instruction parameter indicates a target recipient user of the system intended for the call session. Another example of the control instruction is "Give me my mom", in which the phrase element "Give me" is the instruction name, denoting that the call session is required. In this case, the phrase element "my mom" is the instruction parameter, associated with the given control instruction.

The name of the control instruction, that is included in the voice command, is selected from a predetermined instruction name list. Said predetermined instruction name list includes predetermined names for the control instructions assigned for the system.

In the second option for initiating a voice communication between the caller and recipient users, the caller user utters a call proposal voice phrase in natural language into his personal communication device. The call proposal voice phrase is not a voice command to the system from a predetermined list, but rather an initial phrase of the communication dialogue between the users. The call proposal phrase is addressed to the target recipient user and is delivered by the voice communication system directly to the personal communication device of the recipient user, and is then played back to the recipient user on his personal communication device.

It should be understood that the voice call proposal is an alternative way to establish the call session. It differs from establishing of the call session by the voice command to the system because it enables delivering of the call proposal voice phrase directly to the recipient user, and subsequently playing of the call proposal voice phrase by a caller voice on the recipient PCD, instead of the ringing notification signal.

According to an embodiment of the present invention, the call proposal voice phrase consists of phrase elements. At least one of the phrase elements includes one or more words, which are indicative of a personality characteristic of the recipient user. For example, the call proposal voice phrase can include at least one of the words pointing to the personality of the recipient user. e.g., recipient's official name, nickname or an alias word by which the recipient user can be identified as a contact of the caller by the system.

In operation, the system analyses the caller user utterances, so as to determine a type of the caller user voice phrase, whether it is the voice command phrase, or the call proposal voice phrase.

According to an embodiment of the present invention, the determining of the type of the caller user voice phrase by the voice communication system starts from checking whether the voice phrase corresponds to the predetermined list of available voice commands, and if such a correspondence is found, the system determines that the voice phrase of the caller user is the voice command phrase. Alternatively, if the correspondence between the phrase uttered by the caller user, and the commands included in the predetermined list, is not found, the system treats the voice phrase of the caller user as the call proposal voice phrase, and tries to find and extract the personality characteristic of the target recipient user from that phrase. If the personality characteristic can be found in the voice phrase, the system determines that the voice phrase is the call proposal voice phrase.

In cases where the system cannot determine the type of the analyzed voice phrase, it generates an unrecognition notification for the caller user that informs the caller user that his phrase is not recognized, and transmits the unrecognition notification to the personal communication device of the caller user. Accordingly, the personal communication device notifies the caller user that his voice phrase was not recognized by the system, so that the caller user may reiterate the phrase to retry the initiation of call session, if desired. The unrecognition notification can, for example, be a voice prompt recorded in the system that is intended for playing back to the caller user on his personal communication device. Likewise, the unrecognition notification can be a predetermined audio signal, generated and played by the personal communication device of the caller user.

In the second option for initiating a voice communication between the caller and recipient users, in order to initiate a voice communication, a caller user starts a voice conversation with a remote recipient user, by using his caller personal communication device, without any preliminary actions, in the same natural manner as if the recipient is located nearby, at arm's distance. In turn, the system automatically handles all actions and requirements which are necessary for establishment of a remote full-duplex call session between the communicating caller and recipient users.

According to an embodiment of the present invention, the personal communication devices of the caller and recipient users are personal wearable communication devices. However, it should be understood that, when desired, the system can operate with other communication devices, such as personal desktop and laptop computers, mobile phones, walkie-talkie handheld transceivers, etc.

It should be understood the first option for initiating a voice communication between the caller and recipient users is better suitable for the users who are in formal relationships with each other, w % ben an informal proposal to chat is not appropriate.

On the other hand, the second option of initiation of voice communication is socially acceptable for the users who are in close and informal relationships with each other, e.g. friends, family members, relatives, and other categories of users. However, it should be understood that such a communication system can also be applicable to other categories of users. For example, the system for providing voice communication sessions according to the embodiments of the present invention could be used in hospitals for fast and convenient voice communication between patients and their physicians and nurses. Another example of application of the system includes, but is not limited to, logistics hubs, such as airports, marine ports, warehouses, etc. In these applications, the system can be helpful for convenient coordination of communications of the working personnel.

It should be noted that a call proposal voice phrase can, for example, be any phrase, or a sequence of several phrases that a caller user may say to the recipient user to start a conversation, pointing to the recipient user personality that is included in this phrase. As a non-limiting example, if a caller user named Alice wishes to start a voice communication with a recipient user named Bob, the call proposal phrase can, for example, be as follows: "Hi Bob, can you talk to me now?" or "Bob, when will you be done today?". Alternatively, many other informal phrases can be used that include the recipient user personality "Bob".

According to an embodiment of the present invention, the recipient user, in turn, may respond to the call proposal phrase, for example, by uttering a recipient user response phrase, which is intended for playing back on the personal communication device of the caller user. The recipient user response phrase is semantically indicative of whether the recipient user accepts or rejects the proposed voice communication at the given moment.

Thus, in response to Alice's call proposal phrase of the examples above, the recipient user Bob can for example, say: "Sure, let's talk" or "In two hours, I guess" respectively, when the recipient user intends to accept the call invitations. Alternatively, if the recipient user intends to reject the proposed voice communication, he can, for example, but not limited by this example, reply: "Reject", "Cancel", etc.

The system analyses the uttered recipient user response phrase and recognizes the semantic indication of the recipient intention to accept or reject the proposal of the caller user to start a conversation. Depending on the semantic indication, the system can either establish or reject voice communication between the caller and recipient users.

In particular, if the uttered recipient user response phrase is indicative of acceptance of the voice communication, the system establishes a full-duplex call session between the caller and the recipient, and transmits the recipient user response phrase to the caller side of the system, where the recipient user response phrase is played back on the caller's personal communication device.

As indicated hereinabove, the word(s) of the call proposal phrase, which is (are) indicative of a personality of the recipient user, can trigger creation of the end-to-end connection from the caller personal communication device to the recipient's personal communication device. This end-to-end connection allows for the other passages uttered by the caller user, which follow the initial call proposal phrase, to be transmitted by the system to the recipient user automatically. These passages do not need to be indicative of the recipient user personality, since the recipient user is already suggested by the context of the proposal phrase.

On the other hand, if the uttered recipient user response phrase is semantically indicative of rejection of the voice communication, the system interrupts the procedure of establishment of the call session, and returns to the initial state, which was before the call proposal phrase was uttered by the caller user. In this case, the recipient user response phrase may not be transmitted to the caller user.

According to an embodiment of the present invention, any types of recipient user actions by using his personal communication device, which are indicative of acceptance or rejection of the voice communication, can be utilized by the system as a trigger for establishment or rejection of a full-duplex call session between the caller and the recipient users. For example, such types of the recipient user actions as pressing a control button of the personal communication device in a predetermined action pattern (e.g., pressing the control button once, twice, etc., and/or physically shaking the device by the recipient user in a predetermined manner) can be utilized by the system as indication of the recipient's intention to accept or to reject the initiation of a voice communication between the caller and recipient users.

According to an embodiment of the present invention, termination of the established call sessions within the system can be triggered by any kind of system user activities, resulting in generation of call termination signals indicative of termination of the call session. The call termination signals can be originated either by the recipient user by using his personal communication device, or by the caller user by using the caller's personal communication device.

Thus, according to a general aspect of the present invention, there is provided a novel system for providing a call session between one personal communication device associated with a caller user, and another personal communication device associated with a recipient user.

According to an embodiment of the present invention, the system includes one or more voice communication domains interacting with each other. Each voice communication domain has a corresponding unique domain identifier (ID), and is configured to provide the call sessions between a caller user communication device and at least one recipient user communication device located within the same voice communication domain over a domain communication network. Each voice communication domain is also configured to provide the call sessions between communication devices of the communicating users located in different domains over a Global Communication Network (GCN).

According to an embodiment of the present invention, the system also includes a cross-domain coordinator having at least one publicly accessible IP address in the Global Communication Network. The cross-domain coordinator is configured to coordinate interaction between the voice communication domains over the Global Communication Network by exchanging cross-domain coordination signals with the voice communication domains.

According to an embodiment of the present invention, each voice communication domain includes one or more personal communication devices (PCDs) associated with corresponding users. Each PCD has unique coordinates in the domain communication network, and is configured to provide voice communication between the caller user and the recipient user within the same voice communication domain, and between the caller user and the recipient user located in different voice communication domains.

According to an embodiment of the present invention, each voice communication domain further includes a voice communication server (VCS) deployed within the voice communication domain. The VCS is adapted to be coupled to each of the PCDs via communication links within the voice communication domain.

The voice communication server is configured to control operation of the PCDs by providing PCD control instructions to the PCDs. PCD control instructions can, for example, be instructions to turn up or down the volume level of the sound provided to the users by PCDs. Moreover, PCD control instructions can be instructions to switch between the supporting operating modes of the PCDs, such as a switch from an active mode, to a silent mode of operation, or a switch from the silent mode back to the active mode of operation, etc.

The voice communication server is also configured to provide call sessions between the caller and recipient PCDs within the same voice communication domain. Providing of the call sessions within the same domain includes establishing the call sessions, maintaining the call sessions, and terminating the call sessions between the caller and recipient PCDs. Providing of the call sessions is carried out by exchanging voice information signals between the PCDs via the VCS within the same voice communication domain.

The voice communication server is further configured to coordinate the call session establishment between a caller PCD located in a caller voice communication domain and a target recipient PCD located in another recipient voice communication domain over the Global Communication Network. This coordination is carried out by the voice communication server in cooperation with the cross-domain coordinator.

The coordination of the call session establishment between different domains includes finding the target recipient voice communication domain within the voice communication system by exchanging the cross-domain coordination signals between the caller voice communication domain and the cross-domain coordinator. After finding the target recipient voice communication domain, the voice communication server of the recipient voice communication domain finds the target recipient PCD within the recipient voice communication.

Further, after finding the target recipient PCD, the voice communication servers of the caller and the recipient voice communication domains establishes the call session between the caller PCD located in the caller voice communication domain and the target recipient PCD located in the target recipient voice communication domain. Establishing of the call session is carried out by exchanging cross-domain communication control signals between the voice communication servers of the caller voice communication domain and the recipient voice communication domain, correspondingly.

After establishment of the call session between the PCDs of the corresponding domains, a full-duplex voice communication is provided between the caller PCD located in the caller voice communication domain, and the recipient PCD located in the recipient voice communication domain, by exchanging, via the voice communication servers, the user voice communication signals between the caller voice communication domain and the recipient voice communication domain over the Global Communication Network.

According to an embodiment of the present invention, each of the voice information signals is selected from the following four types: a voice command signal, a call proposal voice signal, a recipient response voice signal, and a user voice communication signal.

The voice command signal corresponds to at least one user command phrase provided verbally by the caller and recipient users. The user command phrase is indicative of a user control instruction to control operation of the voice communication system. The user command phrase includes an instruction name and associated instruction parameters required for executing the user control instruction. The user control instruction is selected from a call session establishment instruction and a PCD control instruction.

The call proposal voice signal is indicative of at least one call proposal phrase uttered by the caller user. The call proposal voice signal is indicative of the caller user intention to establish the call session. The call proposal phrase includes at least one personality characteristic of the recipient user.

The recipient response voice signal is indicative of a recipient user response phrase. The recipient user response phrase is indicative of the recipient user intention to accept the call session, or to reject the call session.

The user voice communication signals are provided verbally by the caller and recipient users during the call session. The user voice communication signals correspond to voice communication between the caller user and the recipient user.

According to an embodiment of the present invention, the voice communication server is also configured for analyzing each of the exchanged voice information signals, so as to determine a type of the voice information signal.

Accordingly, if the type of the voice information signal is the voice command signal, which is indicative of the call session establishment instruction of the caller user to the voice communication server to establish the call session by a voice command, then the voice communication server initiates the call session by forwarding a ringing notification signal to the recipient PCD.

Alternatively, if the type of the voice information signal is the call proposal voice signal, then the voice communication server initiates the call session by delivering the voice call proposal to the recipient user that invites the recipient user to establish the call session by playing the voice proposal by a voice of the caller user on the recipient PCD.

According to another general aspect of the present invention, there is provided a voice communication method for providing call sessions between personal communication devices of a caller user and a recipient user for the system described hereinabove. The method includes generating a voice information signal by a caller PCD. The voice information signal is selected from a voice command signal indicative of the call session establishment control instruction, and a call proposal voice signal indicative of the caller user intention to establish the call session. After generation, the voice information signal is transmitted from the caller PCD to the voice communication server of the voice communication domain. The voice communication server receives the voice information signal and analyzes the received voice information signal, so as to determine the selected type of the voice information signal.

Accordingly, if the voice information signal is determined as the voice command signal indicative of a call session establishment instruction, the voice communication server establishes the call session by a voice command of the caller user to initiate the call session by ringing a notification sound signal on the recipient PCD. Then, the voice communication server provides a full-duplex exchange of user voice communication signals between the caller PCD and the recipient PCD via the voice communication server during the call session. When desired by either the caller user or the recipient user, the voice communication server terminates the call session between the caller and the recipient PCDs.

In turn, if the voice information signal is determined as the call proposal voice signal, the voice communication server establishes the call session by delivering the voice call proposal to the recipient user to establish the call session, and subsequent playing the voice call proposal by a caller voice on the recipient PCD. The establishing of the call session includes receiving and analyzing, by the voice communication server, a recipient user reaction signal to the voice call proposal generated by the recipient PCD, so as to determine the recipient user intention whether to accept or to reject the voice call proposal.

Accordingly, if the recipient user intention is determined as rejection of the voice call proposal, the voice communication server interrupts establishment of the call session to cancel establishment of the call session. On the other hand, if the recipient user intention is determined as acceptance of the voice call proposal, the voice communication server provides a full-duplex exchange of user voice communication signals between the caller PCD and the recipient PCD via the voice communication server during the call session.

When desired by either the caller user or the recipient user, the voice communication server terminates the call session between the caller and the recipient PCDs.

Moreover, if the voice information signal is determined as the voice command signal indicative of a PCD control instruction, the voice communication server controls operation of the caller PCD by the voice communication server.

There has thus been outlined, rather broadly, the more important features of the invention in order that the detailed description thereof that follows hereinafter may be better understood. Additional details and advantages of the invention will be set forth in the detailed description, and in part will be appreciated from the description, or may be learned by practice of the invention.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
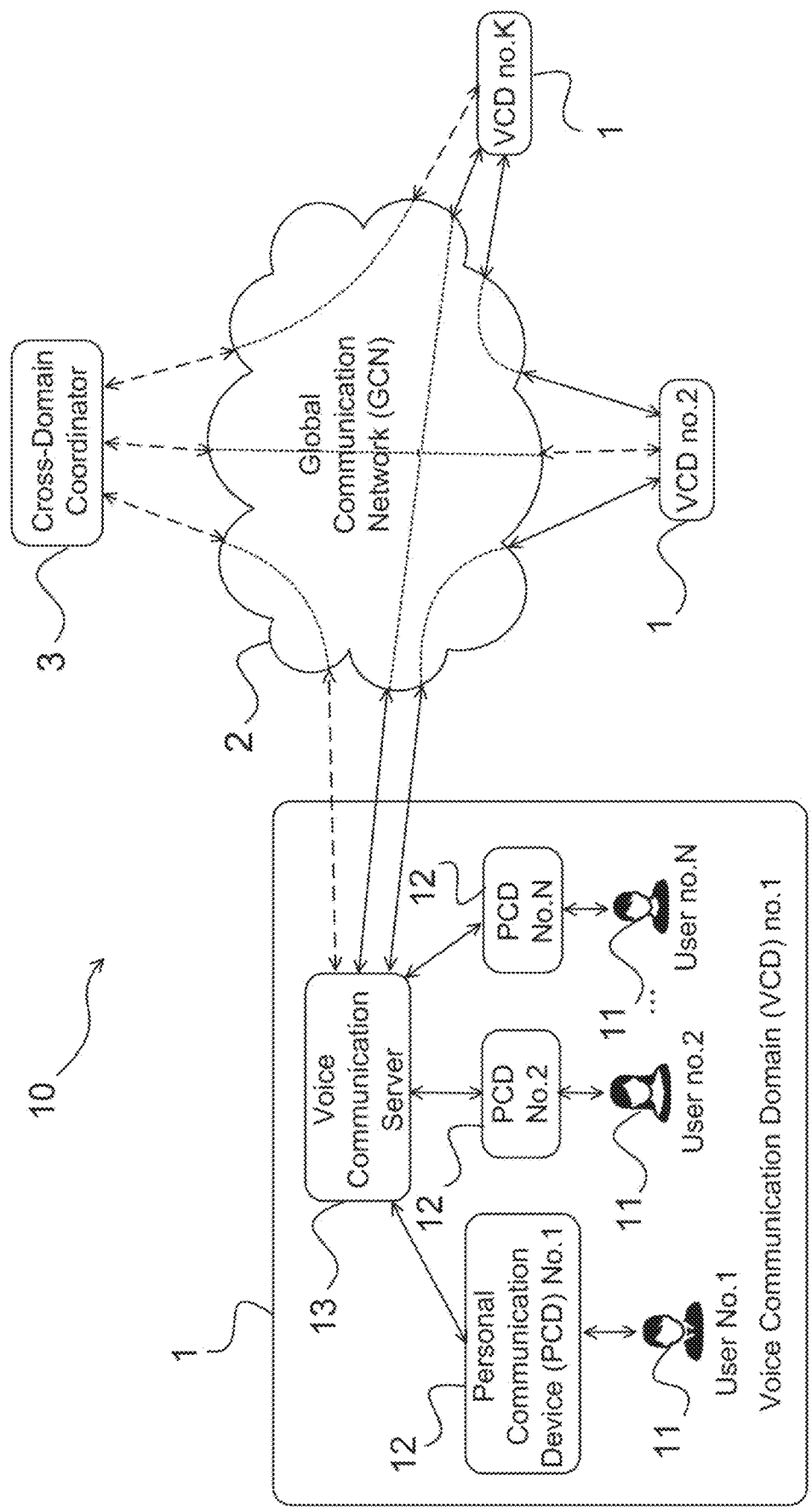
FIG. 1 illustrates a general schematic block diagram of a system for voice communication between sender users and recipient users over a communication network.

The principles and operation of the system and method for providing call sessions between one personal communication device associated with a caller user and another personal communication device associated with a recipient user, according to the present invention, may be better understood with reference to the drawings and the accompanying description, it being understood that these drawings and examples in the description are given for illustrative purposes only and are not meant to be limiting. In addition, the description and drawings do not necessarily require the order illustrated. It will be further appreciated that certain actions and/or steps may be described or depicted in a particular order of occurrence, while those skilled in the art will understand that such specificity with respect to sequence is not actually required.

System, device and method components have been represented, where appropriate, by conventional symbols in the drawings, showing only those specific details that are pertinent to understanding the various embodiments, so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment, may not be depicted in order to facilitate a less obstructed view of these various embodiments.

The same reference numerals and alphabetic characters will be utilized for identifying those components which are common in the voice communication system and its components shown in the drawings throughout the present description of the invention. It should be noted that the blocks in the drawings illustrating various embodiments of the present invention are intended as functional entities only, such that the functional relationships between the entities are shown, rather than any physical connections and/or physical relationships.

Some portions of the detailed descriptions, which follow herein below, are presented in terms of algorithms and/or symbolic representations of operations on data represented as physical quantities within registers and memories of a computer system. An algorithm is here conceived to be a sequence of steps requiring physical manipulations of physical quantities and leading to a desired result. Usually, although not necessarily, these quantities take the form of electrical or magnetic signals capable of being stored, transferred, combined, compared, and otherwise manipulated. In the present description, these signals can be referred to as values, elements, symbols, terms, numbers, or the like.

Figure 2:
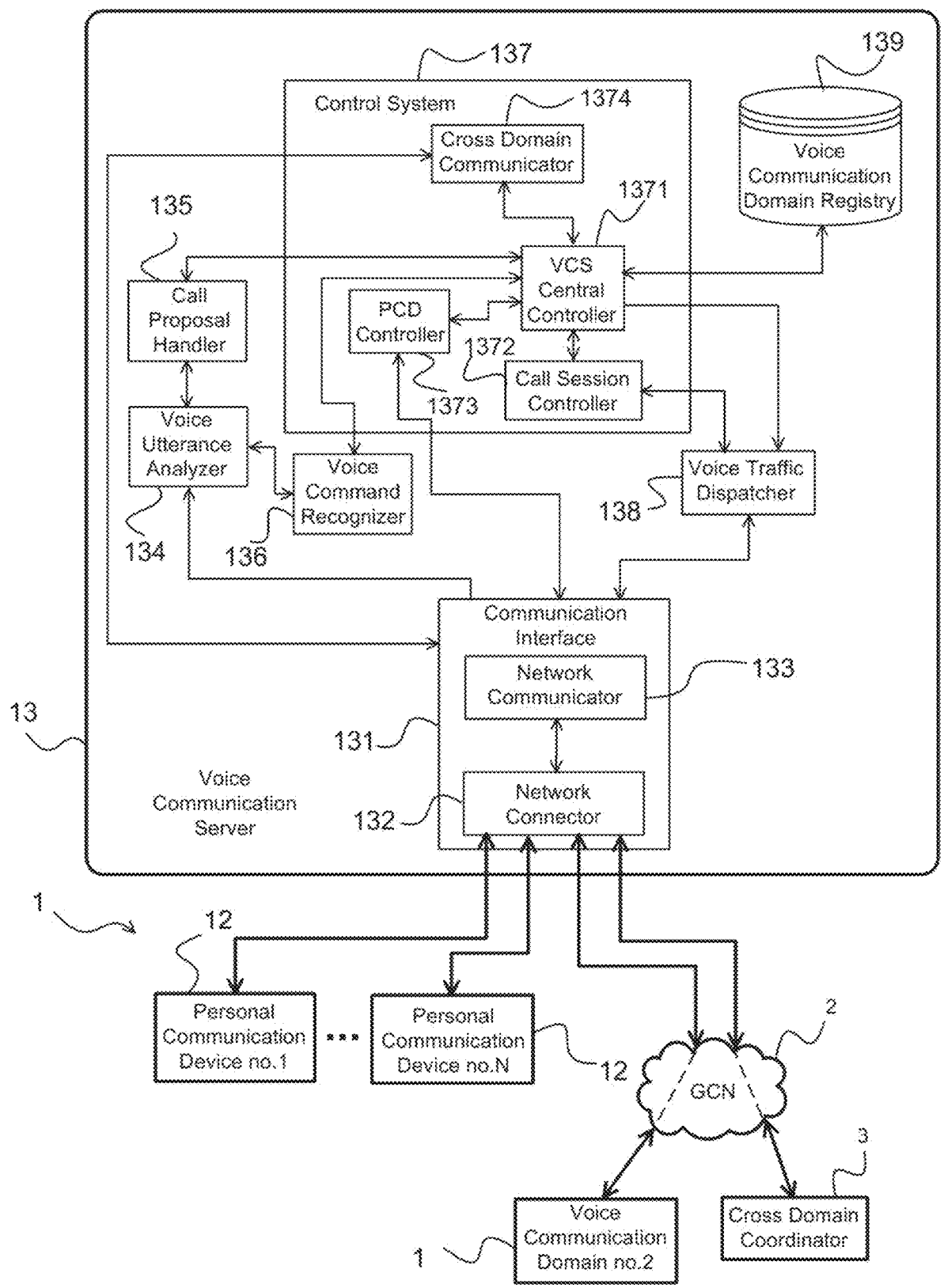
FIG. 2 illustrates a schematic block diagram of a configuration of a voice communication domain of the system for providing call sessions between personal communication devices of caller users and recipient users, according to one embodiment of the present invention.

Referring to FIG. 2, a voice communication system 10 for providing call sessions between personal communication devices (PCDs) 12 of caller users and recipient users of the system is described, according to an embodiment of the present invention. The system includes one or more voice communication domains 1 interacting with each other.

Each voice communication domain 1 has a corresponding unique domain identifier (ID), and is configured to provide call sessions between a caller's user personal communication device and a recipient's user personal communication device located within the voice communication domain over a domain communication network. Each voice communication domain is also configured to provide call sessions between the personal communication devices of the communicating users located in different domains over a Global Communication Network (GCN).

According to an embodiment of the present invention, the system also includes a cross-domain coordinator 3 having at least one publicly accessible IP address in the Global Communication Network. The cross-domain coordinator 3 is configured to coordinate interaction between the voice communication domains 1 over the Global Communication Network by exchanging cross-domain coordination signals with the voice communication domains.

According to an embodiment of the present invention, each voice communication domain 1 includes one or more personal communication devices (PCDs) 12 associated with corresponding users (not shown). Each PCD 12 has unique coordinates in the domain communication network, and is configured to provide voice communication between the caller user and the recipient user within the same voice communication domain and between the caller user and the recipient user located in different voice communication domains.

Examples of domain communication networks suitable for the system of the present invention include, but are not limited to, Internet Protocol (IP) based communication networks, both wireless and wired, such as Wi-Fi or Ethernet communication networks, DECT (Digital Enhanced Cordless Telecommunications) based communication networks, cellular mobile networks, Wi-MAX networks, etc.

Examples of coordinates of the personal communication device 12 within the communication network include, but are not limited to an IP address in a TCP/IP communication network, a number of radio channels within a predetermined radio frequency allocation, and a unique identifier in a predetermined voice communication system, etc.

According to an embodiment of the present invention, each voice communication domain 1 further includes a voice communication server (VCS) 13 deployed within the voice communication domain 1. The VCS 13 is adapted to be coupled to each of the PCDs 12 via communication links within the voice communication domain. The communication links can be represented by connections based on existing domain communication networks. For example, communication links can be Wi-Fi wireless connections based on the IEEE 802.11 communication standard. As another example, it can be DECT (Digital Enhanced Cordless Telecommunications wireless connections, etc.

It should be understood that the voice communication server 13 includes electronic components and can be implemented as computer systems including corresponding hardware, software, and/or firmware. In particular, the voice communication server 13 can be implemented on the basis of a stand-alone computer system having a combination of dedicated hardware and software. The hardware of the voice communication server 13 can be configured as a corresponding system including such a main component as a central processing unit (CPU), a main memory (RAM), a read only memory (ROM), a non-volatile memory (NVM) or persistent storage device, an external memory, etc.

Alternatively, the voice communication server 13 can be implemented as a cloud based service.

It should also be appreciated that various components of the voice communication server 13 described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of the respective components are fabricated or implemented on separate IC chips.

The processor of the voice communication server 13 can be preprogrammed by suitable software models capable of analyzing the corresponding input information during signal exchanges between the personal communication devices 12, and the voice communication server 13. The software components can be stored in the ROM, a rewritable persistent storage device like a hard disk, a solid state memory device like a flash memory, an external memory device or the like, and, when required, can be loaded into the RAM, and executed by the processor(s). Accordingly, the processor can perform a number of data processing steps, calculations, or estimating functions, some of which will be discussed hereinbelow.

The voice communication server 13 is configured to control operation of the PCDs 12 by providing PCD control instructions to the PCDs 12. PCD control instructions can, for example, be instructions to turn up or down the volume level of the sound provided to the users 11 by PCDs 12. Moreover, PCD control instructions can be instructions to switch between the supporting operating modes of the PCDs, such as a switch from an active mode to a silent mode of operation, or a switch from the silent mode back to the active mode of operation, etc. The PCD control instructions can, for example, be implemented as information messages carrying information data. The information data can, for example, be represented by a known standard data format, such as JSON (JavaScript Object Notation), XML (Extensible Markup Language), CSV (Comma-Separated Values), etc.

According to an embodiment of the present invention, the voice communication server 13 is also configured to provide call sessions between the caller and recipient PCDs 12 within the same voice communication domain 1. Providing of the call sessions within the same domain includes establishing the call sessions, maintaining the call sessions, and terminating the call sessions between the caller and recipient PCDs 12. Providing of the call sessions within the same domain is carried out by exchanging voice information signals between the PCDs 12 via the VCS 13 within the same voice communication domain.

The voice communication server 13 is further configured to coordinate the call session establishment between a caller PCD 12 located in a caller voice communication domain 1 and a target recipient PCD 12 located in another recipient voice communication domain 1 over the Global Communication Network (GCN) 2. This coordination of establishment of the call session is carried out by voice communication servers 13 of the caller and the recipient voice communication domains in cooperation with the cross-domain coordinator 3.

Coordination of the call session establishment between different domains includes finding the target recipient voice communication domain within the voice communication system by exchanging the cross-domain coordination signals between the voice communication server 13 of the caller voice communication domain and the cross-domain coordinator 3. After finding the target recipient voice communication domain, the voice communication server 13 of the recipient voice communication domain finds the target recipient PCD 12 within the found recipient voice communication domain 1 by exchanging the cross-domain coordination signals between the cross-domain coordinator 3 and the voice communication server of the found recipient voice communication domain.

Further, after finding the target recipient PCD 12, the voice communication servers 13 of the caller and recipient voice communication domains establish the call session between the caller PCD 12 located in the caller voice communication domain and the found target recipient PCD 12 located in the target recipient voice communication domain 1. Establishing of the call session is carried out by exchanging cross-domain communication control signals between the voice communication server 13 of the caller voice communication domain and the voice communication server 13 of the recipient voice communication domain 1.

After establishment of the call session between the PCDs of the corresponding domains, a full-duplex voice communication is provided between the caller PCD 12 located in the caller voice communication domain 1 and the recipient PCD 12 located in the recipient voice communication domain 1 by exchanging, via the voice communication servers 13, of the user voice communication signals between the caller voice communication domain and the recipient voice communication domain over the Global Communication Network.

According to an embodiment of the present invention, each of the voice information signals is selected from the following four types: a voice command signal, a call proposal voice signal, a recipient response voice signal, and a user voice communication signal.

The voice command signal corresponds to at least one user command phrase provided verbally by the caller and recipient users. The user command phrase is indicative of a user control instruction to control operation of the voice communication system. The user command phrase includes an instruction name and associated instruction parameters required for executing the user control instruction. The user control instruction is selected from a call session establishment instruction and a PCD control instruction.

A call session can, for example, be initiated by the following control instruction provided verbally within a voice command by a caller user: "Call to Bill Morrison", where a phrase element "Call" is an instruction name denoting that establishing of the call session is required. In turn, the phrase element "Bill Morrison" is an instruction parameter, associated with the given control instruction. The instruction parameter indicates a target recipient user of the system intended for the call session. Another example of the control instruction is "Give me my mom", in which the phrase element "Give me" is the instruction name, denoting that the call session is required. In this case, the phrase element "my mom" is the instruction parameter, associated with the given control instruction.

The PCD control instruction can, for example, be "Turn the volume up". In this example, the phrase element "Turn volume" is an instruction name denoting that the sound level of the audio output of the PCD device is required to be changed. The phrase element "up" is an instruction parameter, associated with the given control instruction. It indicates that the sound level needs to be increased by a predetermined value. Another example of a PCD control instruction can be "Do not disturb", where the phrase element "Do not disturb" is an instruction name denoting that the PCD device needs to be switched to the silent mode. It should be noted that there is no associated instruction parameter here.

The call proposal voice signal is indicative of at least one call proposal phrase uttered by the caller user. The call proposal voice signal is indicative of the caller user's intention to establish the call session. The call proposal phrase includes at least one personality characteristic of the recipient user. As a non-limiting example, if the caller user named Alice wishes to start a call session with a recipient user named Bob, the call proposal phrase can, for example, be as follows: "Hi Bob, can you talk to me now?" or "Bob, when will you be done today?", wherein the personality characteristic of the recipient user is his name "Bob". Alternatively, many other informal phrases can be used that include the recipient user personality "Bob". Examples of personality characteristics include, but are not limited to, a user official name, a user nickname within the voice communication system, a user alias, etc.

According to some embodiments of the present invention, the call proposal voice signal includes a speech signal of the original caller user utterance converted from an acoustic form to a digitized electrical form, and encoded by using one of suitable existing audio codecs. Examples of audio codecs include, but are not limited to, G.711, G.722, G.723.1, G.726, iLBC, Speex, SILK, etc.

The recipient response voice signal is indicative of a recipient user response phrase. The recipient user response phrase is indicative of the recipient user's intention to accept the call session, or to reject the call session. Thus, in response to Alice's call proposal phrase of the examples above, the recipient user Bob can, for example, say the following recipient response phrase: "Sure, let's talk" or "In two hours, I guess" respectively, when the recipient user intends to accept the call invitations. Alternatively, if the recipient user intends to reject the proposed voice communication, he can, for example, but not limited by this example, reply: "Reject", "Cancel", etc.

According to some embodiments of the present invention, the recipient response audio signal includes a speech signal of the original recipient user utterance converted from an acoustic form to a digitized electrical form, and encoded by using one of suitable existing audio codecs. Examples of audio codecs include, but are not limited to, G.711, G.722, G.723.1. G.726, iLBC, Speex, SILK, etc.

The user voice communication signal is provided verbally by the caller and recipient users during the call session. The user voice communication signal corresponds to voice communication dialogue between the caller user and the recipient user.

According to an embodiment of the present invention, the voice communication server 13 is also configured for analyzing each of the exchanged voice information signals, so as to determine a type of the voice information signal.

Accordingly, if the type of voice information signal is the voice command signal, which is indicative of the call session establishment instruction of the caller user to the voice communication server 13 to establish the call session by a voice command, the voice communication server 13 initiates the call session by forwarding a ringing notification signal to the recipient PCD 12.

Alternatively, if the type of the voice information signal is the call proposal voice signal, then the voice communication server 13 initiates the call session by delivering the voice call proposal to the recipient user that invites the recipient user to establish the call session by playing the voice proposal by a caller voice on the recipient PCD 12.

According to an embodiment of the present invention, the voice communication server 13 of each voice communication domain 1 includes a communication interface 131 including a network connector 132 and a network communicator 133 coupled to the network connector 132. The voice communication server 13 also includes a voice utterance analyzer 134 coupled to the network communicator 133 of the communication interface 131, a call proposal handler 135 coupled to the voice utterance analyzer 134, a voice command recognizer 136 coupled to the voice utterance analyzer 134, and a control system 137 coupled to the network communicator 133 of the communication interface 131, to the call proposal handler 135 and to the voice command recognizer 136.

According to an embodiment of the present invention, the control system 137 includes a VCS central controller 1371 coupled to the call proposal handler 135 and to the voice command recognizer 136, a PCD controller 1373 coupled to the VCS central controller 1371 and to the network communicator 133 of the communication interface 131, a call session controller 1372 coupled to the VCS central controller 1371, and a cross-domain communicator 1374 coupled to the VCS central controller 1371 and to the network communicator 133 of the communication interface 131.

The voice communication server 13 also includes a voice traffic dispatcher 138, coupled to the VCS central controller 1371, to the call session controller 1372 and to the network communicator 133 of communication interface 131, and a voice communication domain registry 139 coupled to the VCS central controller 1371.

According to an embodiment of the present invention, the network connector 132 is configured to provide signal exchange of said voice information signals and the PCD control protocol signals between the voice communication server 13 and personal communication devices 12 associated with the users within the voice communication domain 1. The exchange of the PCD control protocol signals can be implemented, for example, in accordance with a REST (Representational State Transfer) architectural style, a SOAP (Simple Object Access Protocol) based web services technology, or by using any other suitable technology.

According to an embodiment of the present invention, the network connector 132 is also configured to provide exchange of the cross-domain coordination signals between the voice communication server 13 and the cross-domain controller 3, and cross-domain communication control signals between the voice communication servers 13 of different voice communication domains 1.

According to an embodiment of the present invention, the network communicator 133 is configured to provide signal exchange of said voice information signals, the PCD control protocol signals, the cross-domain coordination signals, and the cross-domain communication control signals, in accordance with network protocols. The network communicator 133 is also configured to relay the voice information signals to the voice utterance analyzer 134 and to the voice traffic dispatcher 138. The network communicator 133 is also configured to relay the PCD control protocol signals to the PCD controller 1373. The network communicator 133 is also configured to relay the cross-domain coordination signals to the cross-domain communicator 1374, and to relay the cross-domain communication control signals to the cross domain communicator 1374.

According to an embodiment of the present invention, the voice utterance analyzer 134 is configured to receive the voice information signals dispatched by the network communicator 133 of the communication interface 131, and to convert the received voice information signals from speech to text form. The voice utterance analyzer 134 is also configured to provide syntactic analysis of the user phrases from the voice information signals, so as to determine the types of the voice information signals. The voice utterance analyzer 134 is also configured to separate the voice command signal, the call proposal signal, the recipient response signal, and the user voice communication signal from each other. The voice utterance analyzer 134 is also configured to relay the call proposal signal and the recipient response signal to the call proposal handler 135, and to relay the voice command signal to the voice command recognizer 136.

According to an embodiment of the present invention, the call proposal handler 135 is configured to receive and to analyze the call proposal voice signal, so as to determine one or more call proposal phrases, so as to determine the caller user intention to establish the call session, and to determine one or more personality characteristics of the recipient user.

The call proposal handler 135 is also configured to generate caller user intention data including the personality characteristic(s) of the recipient user, and to provide the caller user intention data to the VCS central controller 1371. The caller user intention data can, for example, be represented in any one of known existing formats for data representation, such as JSON (JavaScript Object Notation), XML (Extensible Markup Language), CSV (Comma-Separated Values), etc.

The call proposal handler 135 is also configured to analyze the recipient response voice signal, so as to recognize the recipient user intention. The recipient user intention can be either the recipient acceptance intention or the recipient rejection intention of the call session. The call proposal handler 135 is also configured to generate recipient user intention data indicative of the recipient user intention, and to provide said recipient user intention data to the VCS central controller 1371.

According to an embodiment of the present invention, the voice command recognizer 136 is configured to receive the voice command signal from the voice utterance analyzer 134, and to analyze the command phrases represented by the voice command signal, so as to extract the control instruction names and the associated parameters required for executing the user control instruction. The voice command recognizer 136 is also configured to generate voice command notification signals carrying the extracted control instruction names, and the corresponding associated parameters, and to relay of the generated voice command notification signals to the VCS central controller 1371.

According to an embodiment of the present invention, the VCS central controller 1371 is configured to receive the caller user intention data from the call proposal handler 135. The VCS central controller 1371 is responsive to the caller user intention data, and is further configured to acquire device coordinates of the recipient PCD 12 in the domain communication network from the voice communication domain registry 139 by using said at least one personality characteristic of the recipient user. The VCS central controller 1371 is also configured to generate a transmission command signal, which is indicative of the device coordinates of the recipient PCD 12, and to relay the transmission command signal to the voice traffic dispatcher 136.

The VCS central controller 1371 is also configured to receive the recipient user intention data from the call proposal handler 135. The VCS central controller 1371 is responsive to the recipient user intention data and is further configured to analyze the recipient user intention data in order to determine whether the recipient user intends to accept a call session with the caller user, or to decline the call session. Thus, if the recipient user intends to accept the call session, the VCS central controller 1371 is configured to generate a central controller session instruction signal to establish the call session, and to relay the central controller instruction signal to the call session controller 1372. Alternatively, if the recipient user intends to reject the call session, the VCS central controller 1371 is configured to interrupt establishment of the call session between the caller and the recipient PCDs.

The VCS central controller 1371 is also configured to receive voice command notifications from the voice command recognizer 136. The VCS central controller 1371 is responsive to said voice command notifications and is configured to execute voice commands by generating central controller control instruction signals including the central controller session instruction signal and the central controller PCD instruction signal, and the central controller control instruction signals corresponding to said voice command notifications. The VCS central controller 1371 is also configured to relay the central controller session instruction signal to the call session controller 1372, and to relay the central controller PCD instruction signal to the PCD controller 1373 for execution.

According to an embodiment of the present invention, the call session controller 1372 is configured to receive the central controller session instruction signal from the VCS central controller 1371. The call session controller 1372 is responsive to the central controller session instruction signal and is configured to establish the call session between the caller PCD and the recipient PCD within the corresponding voice communication domain, and between the caller PCD and the recipient PCD of different voice communication domains.

The call session controller 1372 is also configured to generate a voice traffic exchange instruction signal during call session establishment, and to relay the generated voice traffic exchange instruction signal to the voice traffic dispatcher 136.

According to an embodiment of the present invention, the PCD controller 1373 is configured to receive said central controller PCD instruction generated by said VCS central controller 1371 to control functionality of the personal communication devices 12 by generating control request signals and transmitting the generated control request signals to the personal communication devices 12 through the network communicator 133.

According to an embodiment of the present invention, the voice traffic dispatcher 136 is configured to receive and buffer call proposal voice signal from the communication interface 131, and to receive the transmission instruction signal from the VCS central controller 1371. The voice traffic dispatcher 136 is responsive to the transmission instruction signal and is further configured to forward the corresponding buffered call proposal voice signal to the recipient PCD 12 via the communication interface 131.

The voice traffic dispatcher 136 is also configured to receive and buffer the recipient response voice signal from the recipient PCD 12 via the communication interface 131, and to receive the voice traffic exchange instruction signal from the call session controller 1372. The voice traffic dispatcher 136 is responsive to the voice traffic exchange instruction signal to forward the corresponding buffered recipient response voice signal to the caller PCD 12 via the communication interface 131, and then to provide full-duplex exchange of user voice communication signals between the personal communication devices 12 participating in the corresponding voice call session.

According to an embodiment of the present invention, the voice communication domain registry 139 is configured for non-volatile storage and management of user information about the users of the personal communication devices 12. The user information includes one or more personality characteristics of the users and device information about the personal communication devices 12. The device information includes device coordinates in the domain communication network of the corresponding domain 1. The voice communication domain registry 139 is also configured to provide the user information and the device information, in response to a corresponding request from the VCS central controller 1371.

According to an embodiment of the present invention, the cross-domain communicator 1374 is configured to exchange the cross-domain coordination signals with cross-domain coordinator 3, and the cross-domain communication control signals with the voice communication server 13 associated with another voice communication domain 1.

According to an embodiment of the present invention, the communication interface 131 is further configured to receive a recipient response action signal from the personal communication device 12 of the recipient user. The recipient response action signal is indicative of a recipient user action pattern. The recipient user action pattern is indicative of a recipient user intention that can be either a recipient acceptance intention, or a recipient rejection intention of the call session. An example of the recipient user action pattern can be pressing a control button of the communication device in a predetermined action manner, such as pressing the control button once, twice, etc. Likewise, the recipient user action pattern can include physical shaking of the device by the recipient user in a predetermined manner.

The communication interface 131 is also configured to forward the received recipient response action signal to the VCS central controller 1371. The VCS central controller 1371 is further configured to analyze the recipient response action signal in order to determine the indicated recipient user intention and to initiate the establishment of a corresponding call session when the recipient user intention is a recipient acceptance intention.

According to an embodiment of the present invention, the communication interface 131 is further configured to receive a call termination signal from one of the personal communication devices 12 participating in the established call session. In this case, the call termination signal is indicative of an intention of the corresponding participating user to terminate an ongoing call session. The communication interface 131 is configured to forward the received call termination signal to the call session controller 1372 via the PCD controller 1373 and the VCS central controller 1371. The call session controller 1372 is further configured to terminate the ongoing call session by generating a voice traffic interrupting signal and providing the voice traffic interrupting signal to the voice traffic dispatcher 138. The voice traffic dispatcher 138 is further configured to interrupt the ongoing full-duplex exchange of user voice communication signals between the personal communication devices 12 participating in the call session, and to delete all buffered user voice communication signals, in response to said voice traffic interrupting signal. The voice traffic dispatcher 138 is further configured to decouple the personal communication devices 12 participating in the terminated call session from the voice communication server 13.

According to an embodiment of the present invention, the communication interface 131 is further configured to receive a system activation signal followed by the call proposal voice signal provided by the personal communication device 12 of the caller user. The communication interface 131 is configured to forward the received system activation signal to the VCS central controller 1371 via the PCD controller 1373, and to forward the received call proposal voice signal to the voice utterance analyzer 134 and to the voice traffic dispatcher 138.

The VCS central controller 1371 is responsive to the system activation signal, and is further configured to generate an utterance analyzing instruction signal and to provide the utterance analyzing instruction signal to the call proposal handler 135, and to the voice utterance analyzer 134, thereby instructing the call proposal handler 135 and the voice utterance analyzer 134 to begin analyzing the call proposal voice signal. Accordingly, the call proposal handler 135 and the voice utterance analyzer 134 are responsive to the utterance analyzing instruction signal and are configured to begin analyzing the call proposal voice signal, followed by the system activation signal.

Examples of caller user actions that can result in generation of the system activation signal include, but are not limited to, pressing a control button of the communication device in a predetermined pattern (e.g., pressing the control button once, twice, etc.), and/or physically shaking the device by the caller user in a predetermined manner.

In operation, the caller user 11 can click the control button (not shown) of his personal communication device 12, and then the caller user 11 can utter the call proposal phrase. The clicking of the control button, in this example, can result in generation of the system activation signal and in transmission of this signal to the communication interface 131 of the voice communication server 13. Then, the call proposal voice signal, which is indicative of the uttered call proposal phrase, is generated by the caller PCD 12 and transmitted to the communication interface 131 of the voice communication server 13.

Figure 3:
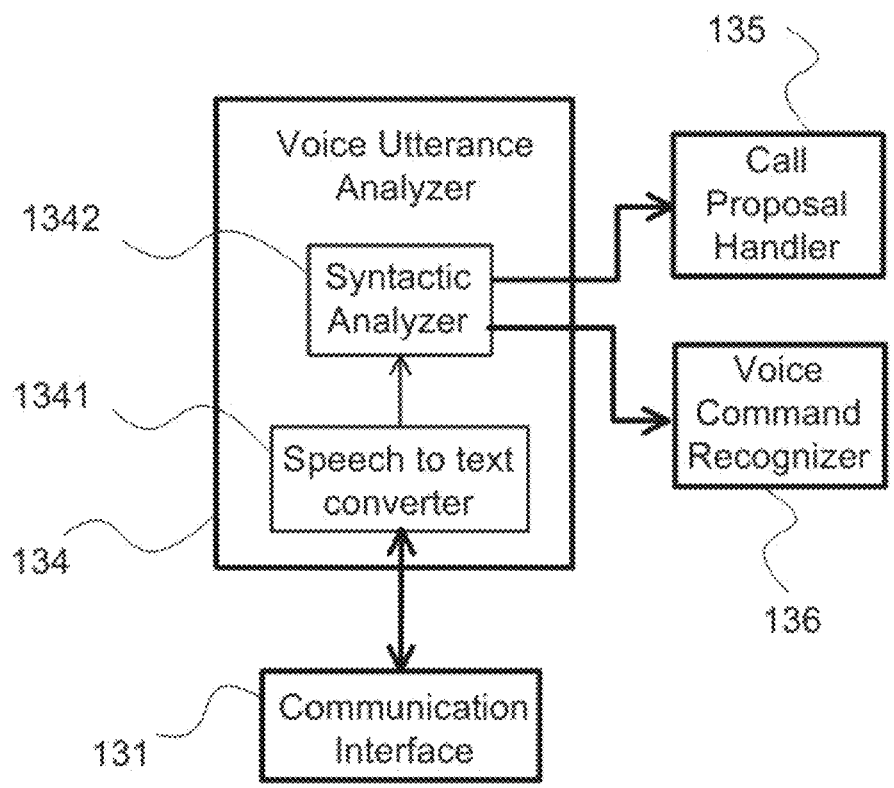
FIG. 3 illustrates a schematic block diagram of a configuration of the voice utterance analyzer of FIG. 2, and external connections of the voice utterance analyzer with other components of the voice communication server of FIG. 2, according to an embodiment of the present invention.

Referring to FIG. 3 a schematic block diagram of a configuration of the voice utterance analyzer (134 of FIG. 2), and external connections of the voice utterance analyzer with other components of the voice communication server (13 of FIG. 2) is illustrated, according to an embodiment of the present invention. The voice utterance analyzer 134 includes a speech to text converter 1341 coupled to the network communicator 133 of the communication interface 131, and a syntactic analyzer 1342 coupled to the speech to text converter 1341, to the call proposal handler 135, and to the voice command recognizer 136.

According to an embodiment of the present invention, the speech to text converter 1341 of the voice utterance analyzer 134 is configured to receive the call proposal voice signal, the recipient response voice signal, and the voice command signal from the network communicator 133 of the communication interface 131, to extract the call proposal phrase uttered by the caller user from the call proposal voice signal and to convert the call proposal phrase into a text form. The voice utterance analyzer 134 is also configured to extract the recipient user response phrase(s) uttered by the recipient user from the recipient response voice signal, and to convert the recipient user response phrase(s) into a text form. The voice utterance analyzer 134 is also configured to extract the voice command phrase uttered either by the caller user or by the recipient user from the voice command signal, and to convert the voice command phrase into a text form.

According to an embodiment of the present invention, the syntactic analyzer 1342 is configured to provide syntactic analysis of the text forms of call proposal phrase(s), the recipient user response phrase(s), and the voice command phrase, correspondingly, so as to decompose the phrases into corresponding interrelated phrase elements. For example, when a caller user named Alice wishes to start a voice communication with a recipient user named Bob, the call proposal phrase "Hey, Bob, can you talk to me?" can be decomposed onto the following phrase elements: "hey", "Bob." "can you", "talk". "to" and "me". As another example, the recipient user response phrase "Sure, let's talk" can be decomposed onto the following phrase elements: "Sure," and "let's", and "talk".

The syntactic analyzer 1342 is also configured to separate the call proposal phrase(s), the recipient user response phrase(s), and the voice command phrase from each other, and to relay the call proposal phrase(s) and the recipient user response phrase(s) to the call proposal handler 135, and to relay the voice command phrase to the voice command recognizer 136.

Figure 4:
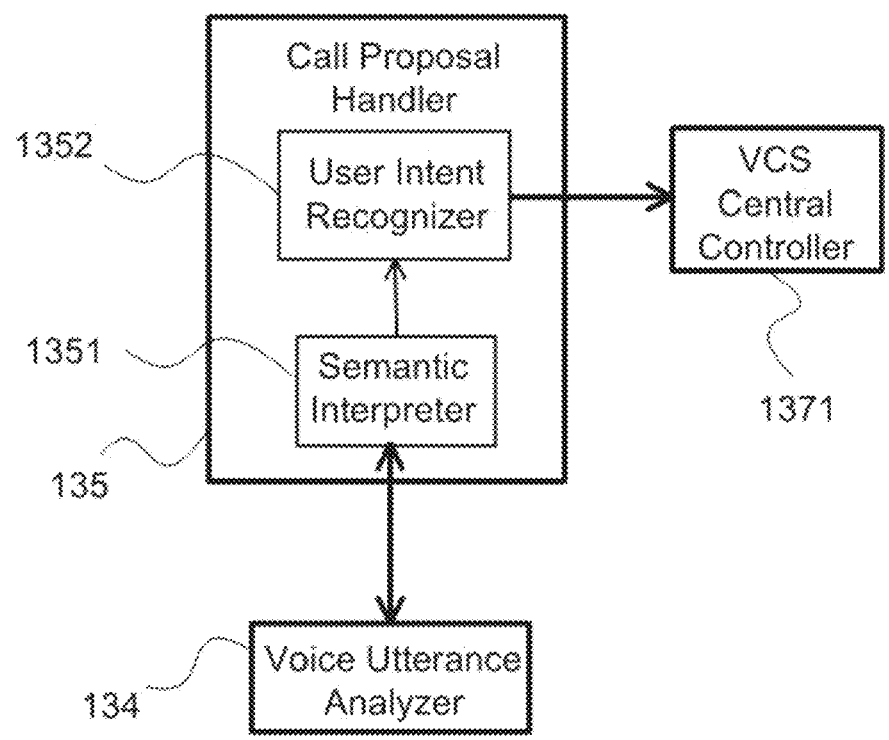
FIG. 4 illustrates a schematic block diagram of a configuration of the call proposal handler of FIG. 2, and external connections of the call proposal handler with other components of the voice communication server of FIG. 2, according to an embodiment of the present invention.

Referring to FIG. 4, a schematic block diagram of a configuration of the call proposal handler (135 of FIG. 2), and external connections of the call proposal handler with other components of the voice communication sever (13 of FIG. 2) is illustrated, according to an embodiment of the present invention. The said call proposal handler 135 includes a semantic interpreter 1351 coupled to the syntactic analyzer 1342 and a user intent recognizer 1352 coupled to the semantic interpreter 1351, and to the VCS central controller 1371.

According to an embodiment of the present invention, the semantic interpreter 1351 is configured to receive the call proposal phrase(s) and the recipient user response phrase(s) from the syntactic analyzer 1342, and to perform semantic interpretation of the phrase elements. The semantic interpretation of the phrase elements can include augmenting the phrase elements by a markup data, which indicate an expected meaning of the corresponding phrase elements in the context of the particular application of the system.

For example, when a caller user named Alice wishes to start a voice communication with a recipient user named Bob, the call proposal handler 135 analyses the following call proposal phrase: "Hey, Bob, can you talk to me?", the semantic interpreter 1351 provides augmentation by marking up the phrase element "Hey" as a greeting, and the phrase element "Bob" as a personality characteristic (i.e., the name) of the recipient user. Likewise, the phrase elements "can you" and "talk" can be interpreted and marked up as an indication of the caller user intention to start voice communication. It should be noted that in this example, the phrase elements "to" and "me" can be disregarded by the semantic interpreter 1351.

Likewise, when the call proposal handler 135 analyses the following recipient user response phrase: "Sure, let's talk", the semantic interpreter 1351 makes augmentation of this phrase by marking up the phrase element "Sure" as an agreement, while the phrase elements "let's" and "talk" is marked up as an intention to accept the invitation of the caller user.

The user intent recognizer 1352 is configured for recognizing the caller user and the recipient user intentions from semantically interpreted phrase elements of the call proposal phrase(s) and the recipient user response phrase(s), and extracting the personality characteristic(s) of the recipient user from the call proposal phrase elements. As an example, when the user intent recognizer 1352 receives, from the semantic interpreter 1351, the phrase elements "can you" and "talk", that have the corresponding expected meaning that indicates the caller user intention to talk, the user intent recognizer 1352 determines the particular kind of intention implied by the particular phrase element or a group of phrase elements. Specifically, the phrase elements "can you" and "talk" are recognized as one aggregate indicative of intention to establish a call session for voice communication.

As another example, when the user intent recognizer 1352 receives from the semantic interpreter 1351 the phrase elements "let's" and "talk" which are originated from Bob, the user intent recognizer 1352 recognizes that the phrase elements "let's" and "talk" in the aggregate indicate a recipient user intention to accept the voice communication proposed by the caller user Alice.

The user intent recognizer 1352 is also configured for generating user intention data, including the personality characteristic(s) of the recipient user corresponding to the call proposal phrase(s), and user intention data indicative of the recipient user intentions corresponding to the recipient user response phrase(s), and providing the generated user intention data to the VCS central controller 1371.

Figure 5:
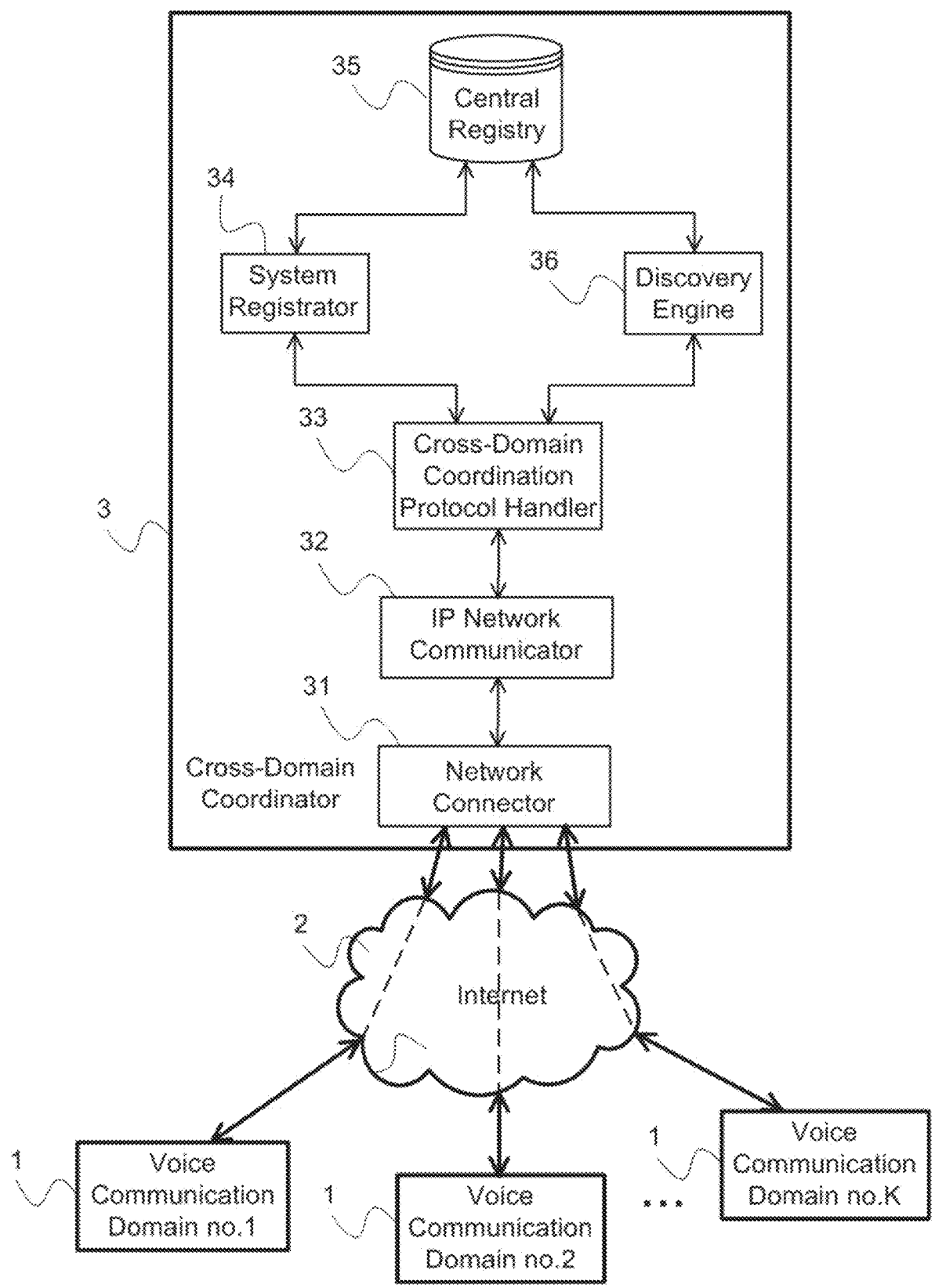
FIG. 5 illustrates a schematic block diagram of the cross-domain coordinator of the voice communication system of FIG. 2, according to some embodiments of the present invention.

Referring to FIG. 5, a schematic block diagram of the cross-domain coordinator 3 of the voice communication system of FIG. 2 is illustrated. The cross-domain coordinator 3 suitable for the present invention can, for example, be the cross-domain coordinator described in U.S. Pat. No. 10,735,598. The cross-domain coordinator 3 includes a network connector 31, an IP network communicator 32 coupled to said network connector 31, a cross-domain coordination protocol handler 33 coupled to the IP network communicator 32, a system registrator 34 coupled to said cross-domain coordination protocol handler 33, a discovery engine 36 coupled to said cross-domain coordination protocol handler 33, and a central registry 35 coupled to the system registrator 34 and to the discovery engine 36.

According to an embodiment of the present invention, the network connector 31 is configured to provide signal exchange of the cross-domain coordination signals over the Global Communication Network between the cross-domain coordinator 3 and a plurality of voice communication servers 13 of the corresponding voice communication domains 1. The cross-domain coordination signals include domain registration signals, user registration signals, and user discovery signals.

The IP network communicator 32 is configured to provide signal exchange of the cross-domain coordination signals between the cross-domain coordinator 3 and the plurality of voice communication servers 13 associated with the corresponding voice communication domains, in accordance with TCP/IP protocols.

The cross-domain coordination protocol handler 33 is configured to exchange said cross-domain coordination signals between the cross-domain coordinator 3 and the plurality of voice communication servers 13 associated with the corresponding voice communication domains 1, in accordance with the cross-domain coordination protocol.

The system registrator 34 is configured to register the voice communication domains 1 and the users associated with said corresponding voice communication domains. The discovery engine 36 is configured to search the user information about the users registered by the system registrator 34 and the corresponding voice communication domains 1. The central registry 35 is configured to provide non-volatile storage of domain information of the voice communication domains 1 registered within the voice communication system 10, and the user information of the users registered within the voice communication system 10 and associated with the corresponding voice communication domains 1.

Figure 6:
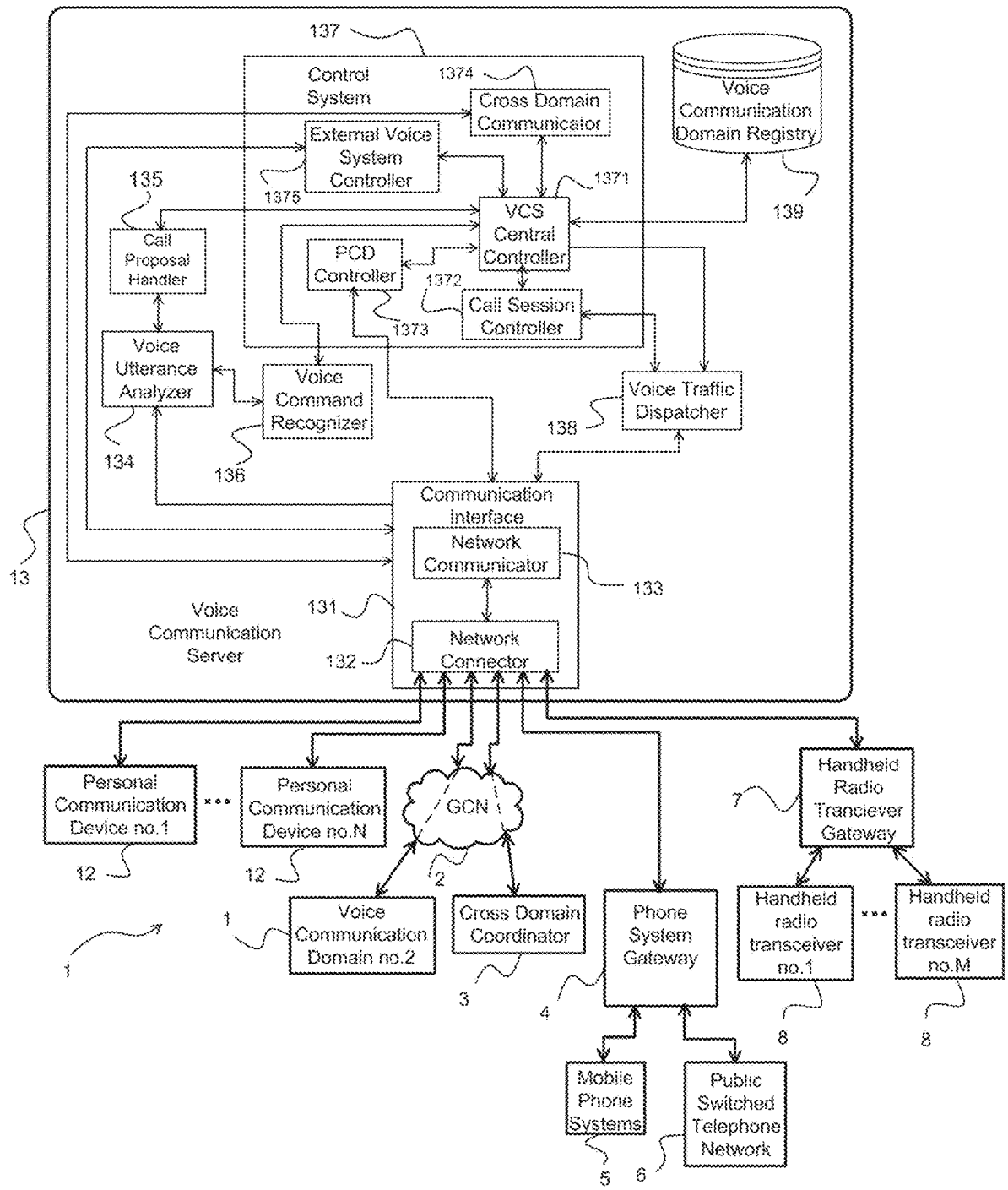
FIG. 6 illustrates a schematic block diagram of a configuration of a voice communication domain of the system for providing call sessions between personal communication devices of caller users and recipient users, according to other embodiments of the present invention.

Referring to FIG. 6, a schematic block diagram of a configuration of a voice communication domain 1 of the system 10 for providing call sessions between personal communication devices of caller users and recipient users is illustrated, according to some embodiments of the present invention. The configuration of the voice communication domain shown in FIG. 6 differs from the configuration shown in FIG. 2 in the fact that this configuration includes the additional possibility of providing voice communications with external mobile phone systems 5, external PSTN phone systems 6, and with handheld radio transceivers 8.

According to this embodiment of the present invention, the voice communication server 13 further includes an external voice system controller 1375 coupled to the network communicator 133 of the communication interface 131 and to the VCS central controller 1371. The external phone system controller 1375 is configured to receive external voice communication control instruction signals from the VCS central controller 1371, and to coordinate communication of the voice communication server 13 with external voice communication systems in response to said external voice communication control instruction signals.

According to this embodiment of the present invention, the VCS central controller 1371 is further configured to generate and to relay the external voice communication control instruction signals to the external phone system controller 1375.

As shown in FIG. 6, the voice communication domain 1 further includes a phone system gateway 4 coupled to said external voice system controller 1375 of the voice communication server 13, to mobile phone systems 5, and to public switched telephone networks 6. The external voice system controller 1375 is configured to coordinate the operation of the phone system gateway 4 for exchanging voice traffic signals and communication control signals between the voice communication server 13 and the mobile phone systems 5, and between the voice communication server 13 and the public switched telephone networks (PSTN) 6, in accordance with mobile and PSTN communication protocols, correspondingly.

As shown in FIG. 6, the voice communication domain 1 also includes a handheld radio transceiver gateway 7 coupled to said external voice system controller 1375 of the voice communication server 13, and to one or more handheld radio transceiver device(s) 8. Accordingly, the external voice system controller 1375 is also configured to coordinate operation of the handheld radio transceiver gateway 7 for exchanging voice traffic signals and communication control signals between the voice communication server 13 and the handheld radio transceiver device(s) 8, in accordance with communication protocols supported by the corresponding handheld radio transceiver device(s) 8.

Figure 7:
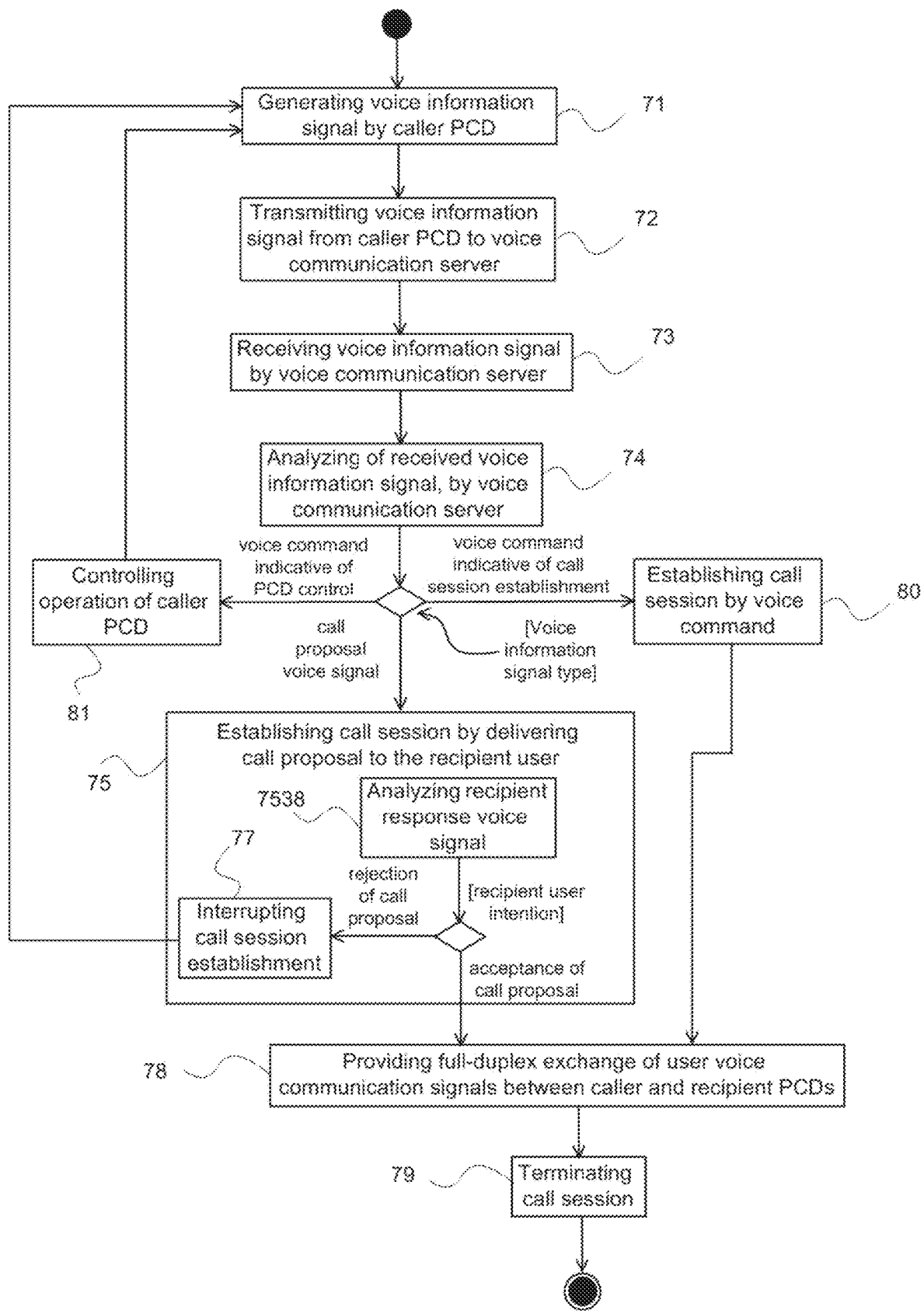
FIG. 7 illustrates a schematic flowchart diagram of a method for providing call sessions between personal communication devices of caller users and recipient users, according to an embodiment of the present invention.

Referring to FIG. 7, a schematic flow chart diagram of a voice communication method for providing call sessions between personal communication devices 12 of a caller user and a recipient user for the system described hereinabove is illustrated, according to an embodiment of the present invention.

The method includes generating (Step 71) a voice information signal by a caller PCD. The voice information signal can be a voice command signal indicative of the call session establishment control instruction, and a call proposal voice signal indicative of the caller user intention to establish the call session.

After generation, the voice information signal is transmitted (Step 72) from the caller PCD 12 to the voice communication server 13 of the voice communication domain 1. The voice communication server 13 receives (Step 73) voice information signal and analyzes (Step 74) the received voice information signal, so as to determine the selected type of voice information signal.

According to an embodiment of the present invention, the receiving (Step 73) of the voice information signal from the caller PCD, by the voice communication server 13, includes buffering a copy of the voice information signal. Such buffering is necessary for storing a copy of the voice information signal during its analyzing (Step 74). Such buffering is also needed in order to forward (Substep 7532) the buffered copy of the signal, when required, to the recipient PCD. It should be noted that the forwarding is required when the selected type of the voice information signal is determined as the call proposal voice signal. Alternatively, when the selected type of the voice information signal is determined as the voice command signal, then the buffered copy is discarded, and can be deleted.

Figure 8:
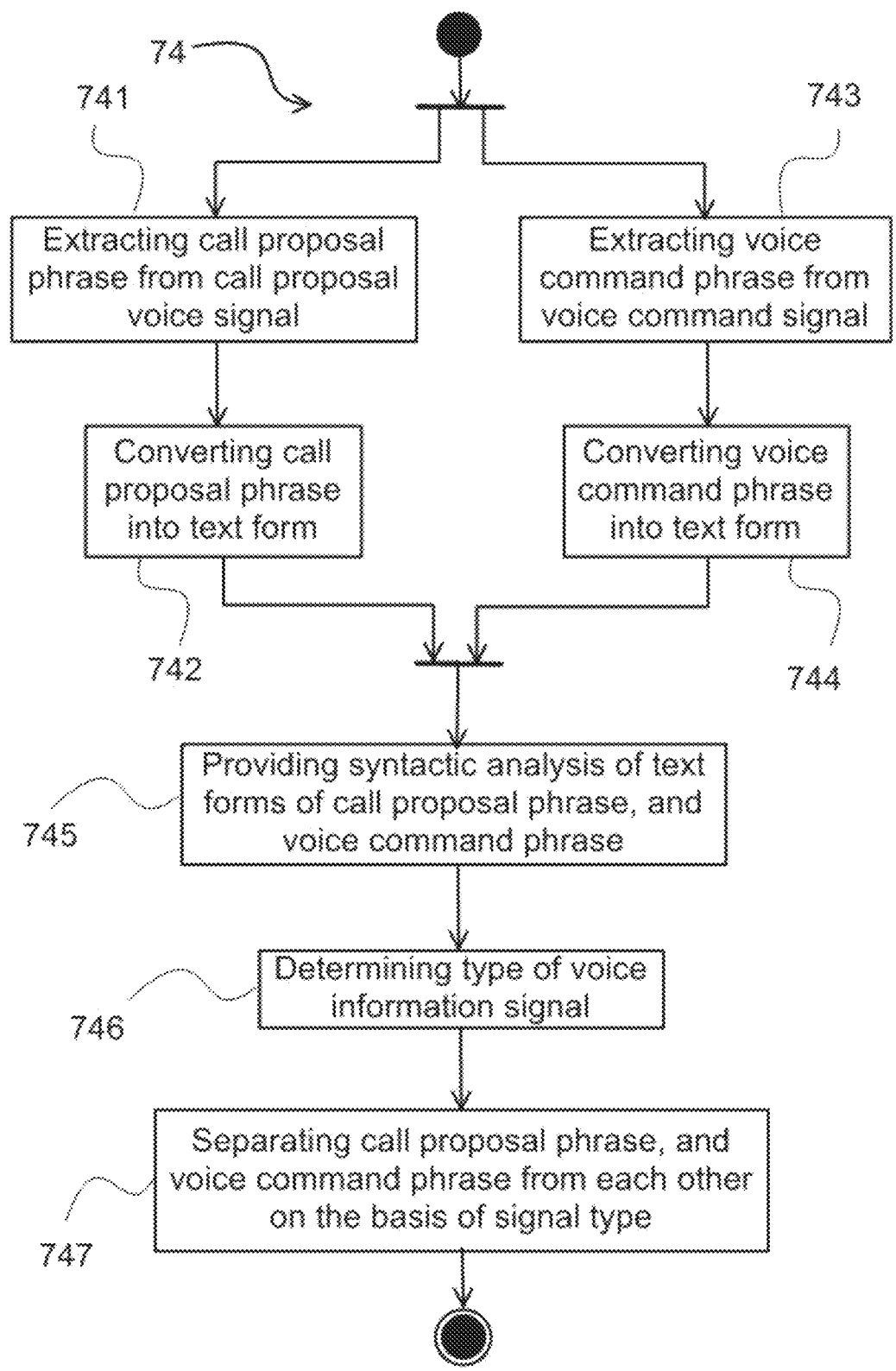
FIG. 8 illustrates a schematic flowchart diagram for analyzing of the received voice information signal of the method of FIG. 7, according to an embodiment of the present invention.

Referring to FIG. 8, a schematic flowchart diagram for the analyzing (Step 74) of the received voice information signal, by the voice communication server, of the method of FIG. 7 is illustrated, according to an embodiment of the present invention. The analyzing (Step 74) of the received voice information signal by the voice communication server (13 in FIG. 2) includes extracting (Substep 741) at least one call proposal phrase uttered by the caller user from the call proposal voice signal and converting (Substep 742) the call proposal phrase into a text form. Moreover, the analyzing includes extracting (Substep 743) the voice command phrase uttered by the caller user from the voice command signal and converting (Substep 744) the voice command phrase into a text form. Then, the analyzing includes providing (Substep 745) syntactic analysis of the text forms of the call proposal phrase(s), and the voice command phrase, correspondingly, so as to decompose the phrases into corresponding phrase elements. Further, the type of the voice information signal to which each corresponding decomposed phrase belongs is determined (Substep 746) by analyzing the phrase elements for each decomposed phrase. The analyzing also includes separating (Substep 747) the call proposal phrase(s), and the voice command phrase from each other on the basis of the determined types of the voice information signal.

According to an embodiment of the present invention, the determining (Substep 746) of the type of the caller user voice phrase by the voice communication system starts from checking whether said phrase elements of the decomposed phrase correspond to an instruction name list including predetermined names for the control instructions assigned for the system for establishment of call sessions. If correspondence of the voice phrase elements to the instruction name list is found, then the type of the voice information signal is defined as of the voice command signal.

Alternatively, if correspondence of the voice phrase elements in the phrase uttered by the caller user to the instruction name list is not found, then the voice communication server of the system treats the voice phrase of the caller user as the call proposal voice phrase, and tries to find and extract the personality characteristic(s) of the target recipient user from that phrase. Further, if the personality characteristic(s) of the recipient user is found in the voice phrase elements, then the type of the voice information signal is defined as the call proposal voice signal.

In cases where the voice communication server cannot determine the type of analyzed voice phrase, it generates an unrecognition notification signal for the caller user, and transmits the unrecognition notification signal to the personal communication device of the caller user, thereby informing the caller user that the voice information signal from the caller PCD was not recognized, so that the caller user may retry initiation of the call session, if desired.

The unrecognition notification signal can, for example, include a voice prompt recorded in the system that is intended for playing back to the caller user on his personal communication device. Likewise, the unrecognition notification can be a predetermined audio signal, generated and played by the personal communication device of the caller user.

Turning back to FIG. 7, if, during the analyzing (Step 74) of the received voice information signal, the voice communication server determines that the voice information signal is the voice command signal indicative of a call session establishment instruction, the voice communication server 13 establishes (Step 80) the call session by a voice command of the caller user to initiate the call session by ringing a notification sound signal on the recipient PCD 12.

Figure 9:
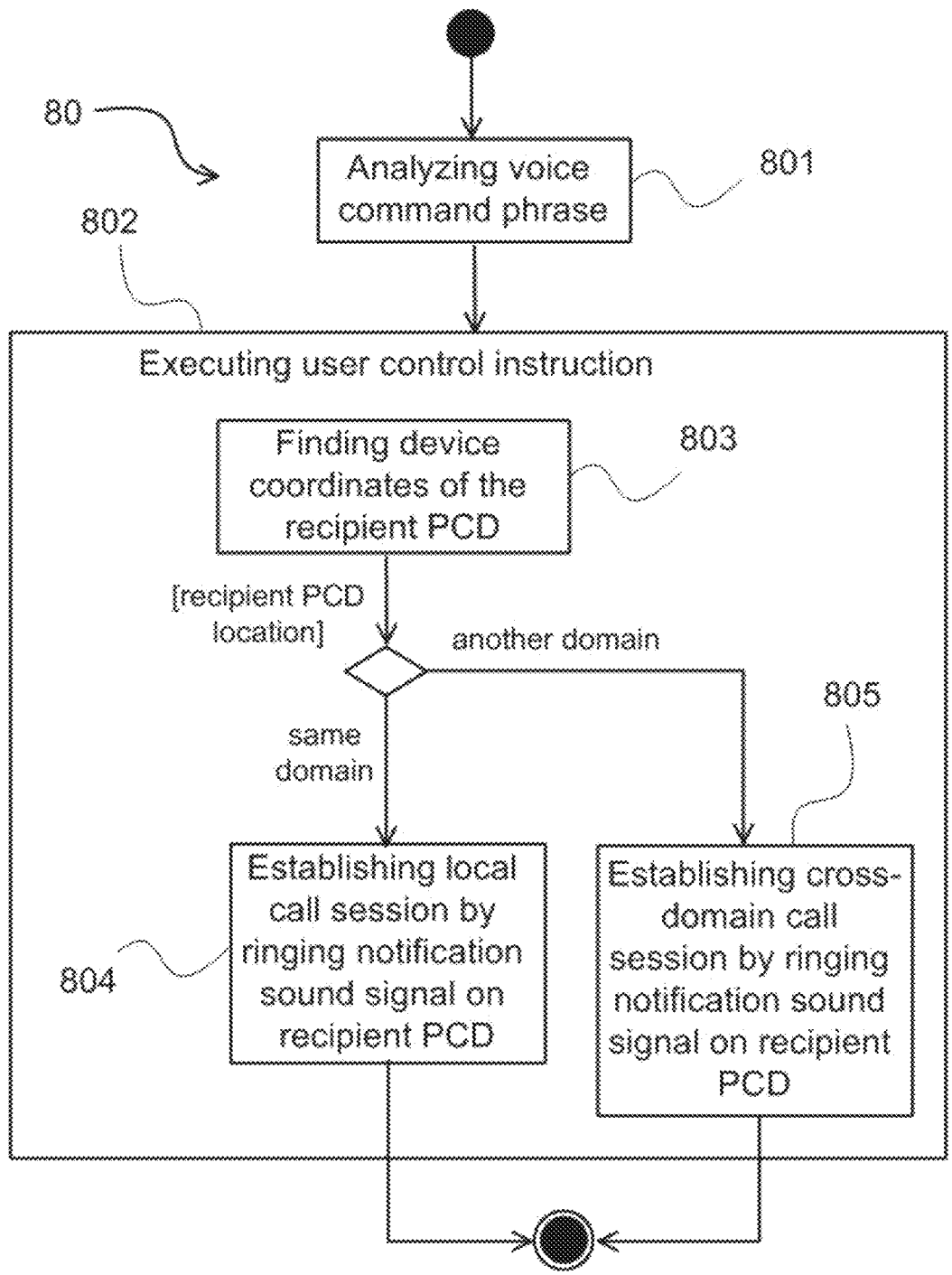
FIG. 9 illustrates a schematic flowchart diagram for establishing of the call session by the voice command of the method of FIG. 7, according to an embodiment of the present invention.

Referring to FIG. 9, a schematic flowchart diagram for the step of the establishing of the call session, by the voice command (Step 80), of the method of FIG. 7, is illustrated, according to an embodiment of the present invention. The establishing (Step 80) of the call session by the voice command includes analyzing (Substep 801) of the voice command phrase by the voice communication server (13 in FIG. 2) to extract the user control instruction. The user control instruction includes instruction name and associated instruction parameters from the voice command phrase. The establishing (Step 80) of the call session by the voice command further includes executing (Substep 802) the user control instruction by the voice communication server 13, so as to establish the call session with the recipient PCD.

According to an embodiment of the present invention, the establishing of the call session in this case includes finding (Substep 803), by the voice communication server 13, the device coordinates of the recipient PCD in the domain communication network by using said associated instruction parameters. Accordingly, if the recipient PCD is found within the same voice communication domain, then the local call session is established (Substep 804) by ringing a notification sound signal on the recipient PCD. In the same manner, if the recipient PCD is located in another voice communication domain, the cross-domain call session is established (Substep 805) also by ringing a notification sound signal on the recipient PCD.

Figure 10:
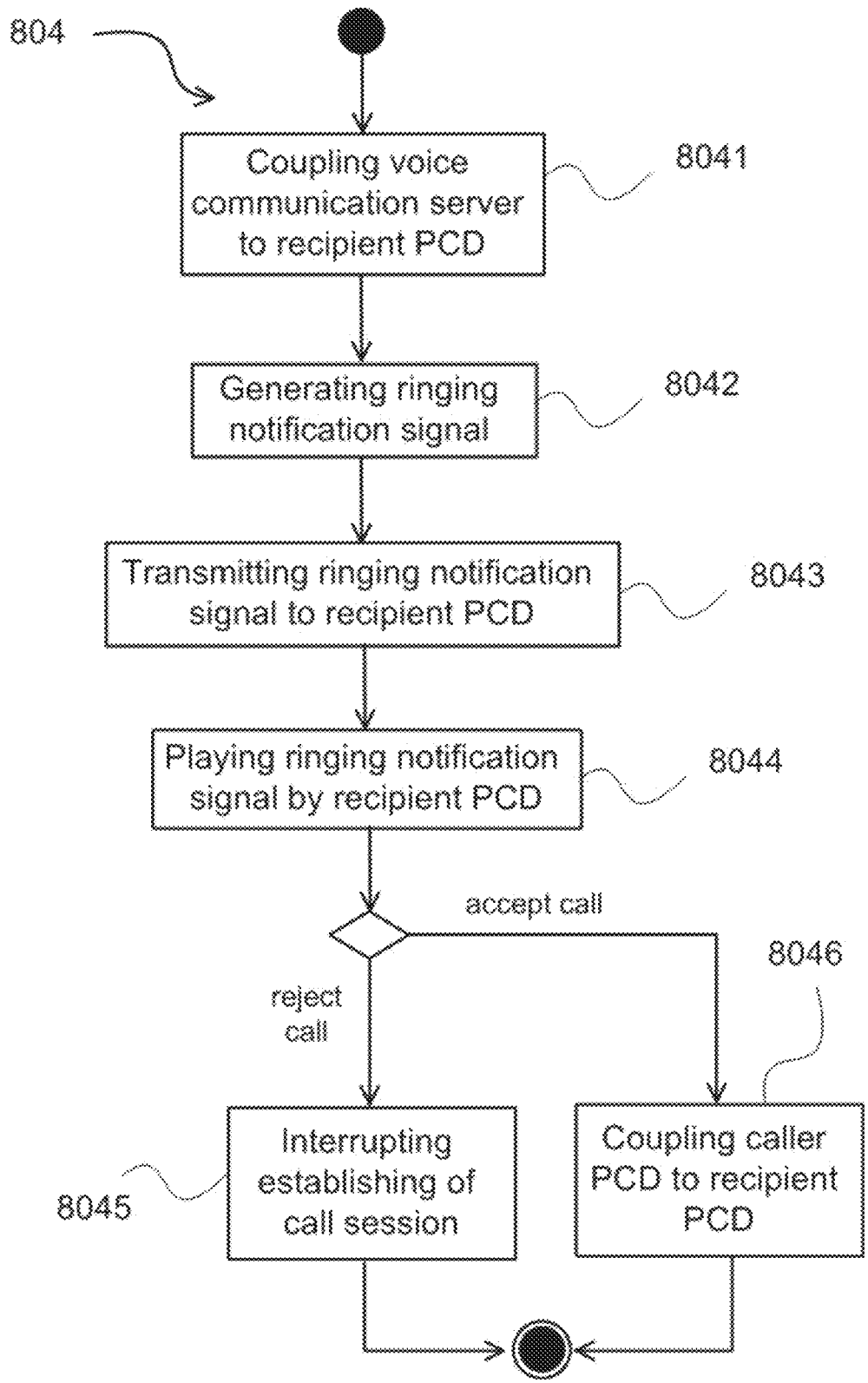
FIG. 10 illustrates a schematic flowchart diagram for establishing of the local call session by ringing a notification sound signal on the recipient PCD of the method of FIG. 9, according to an embodiment of the present invention.

FIG. 10 illustrates a schematic flowchart diagram for establishing (Substep 804 of FIG. 9) of the local call session, according to an embodiment of the present invention. Establishing (Substep 804) of the local call session includes coupling (Substep 8041) the voice communication server to the recipient PCD by using the device coordinates, generating (Substep 8042) the ringing notification signal by the voice communication server, transmitting (Substep 8043) ringing a notification signal to the recipient PCD, and playing (Substep 8044) the ringing notification by the recipient PCD to the recipient user in a sound form.

Accordingly, if the recipient user rejects the call, establishing of the local call session is interrupted (Substep 8045). Alternatively, if the recipient user accepts the call, the local call session is established by coupling (Substep 8046) the caller PCD to the recipient PCD.

Figure 11:
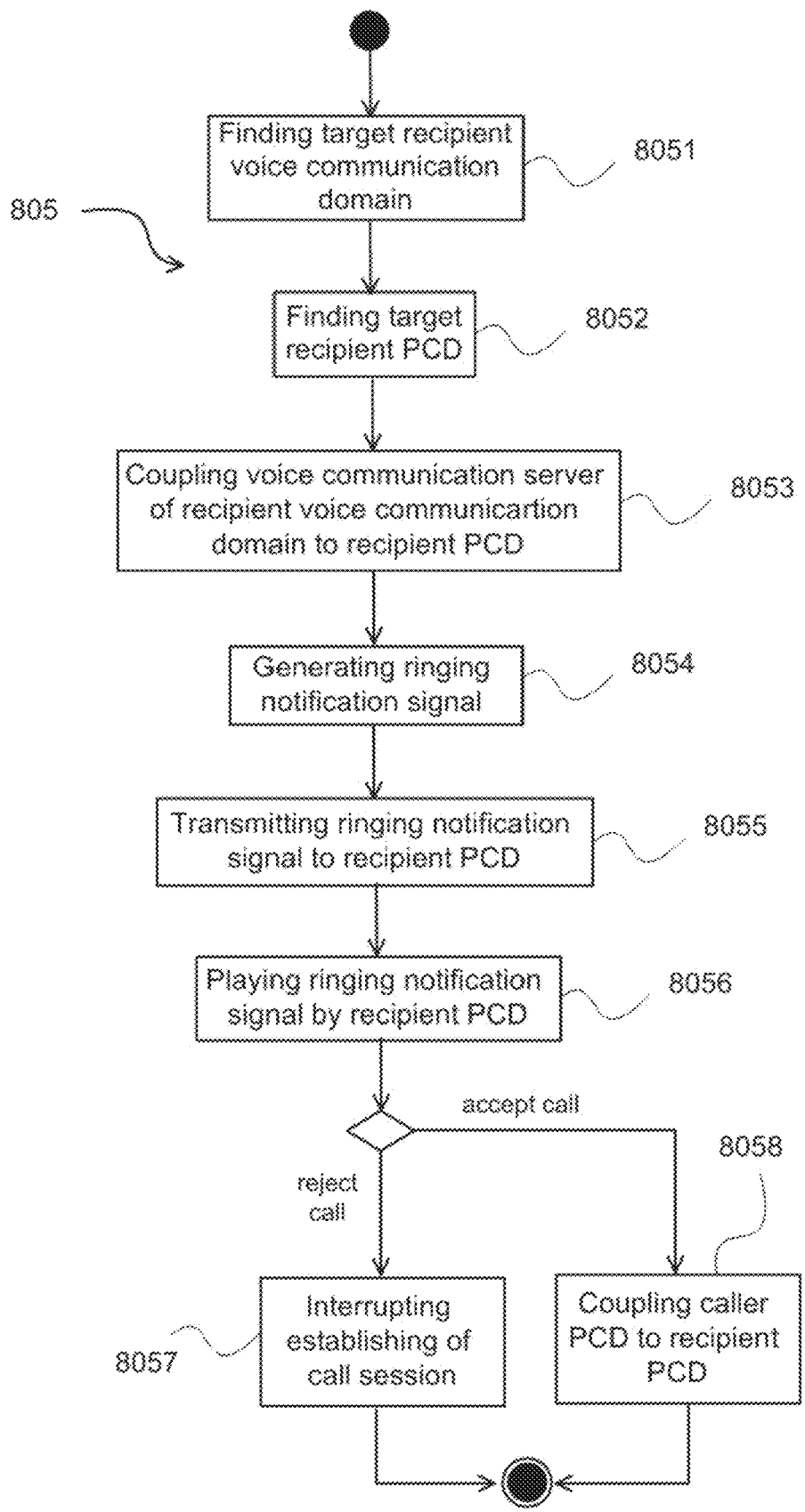
FIG. 11 illustrates a schematic flowchart diagram for establishing of the cross-domain call session by ringing a notification sound signal on the recipient PCD of the method of FIG. 9, according to an embodiment of the present invention.

FIG. 11 illustrates a schematic flowchart diagram for establishing (Substep 805 of FIG. 9) of the cross-domain call session, according to an embodiment of the present invention. Establishing (Substep 805) of the cross-domain call session includes finding (Substep 8051) a target recipient voice communication domain by exchanging the cross-domain coordination signals between the caller voice communication domain and the cross-domain coordinator, finding (Substep 8052) the target recipient PCD within the recipient voice communication domain by exchanging the cross-domain coordination signals between the cross-domain coordinator and the recipient voice communication domain, and coupling (Substep 8053) the voice communication server of the recipient voice communication domain to the recipient PCD. Then, the ringing notification signal is generated (Substep 8054) by the voice communication server of the recipient voice communication domain, which is transmitted (Substep 8055) to the recipient PCD. Thus, the ringing notification is played (Substep 8056) by the recipient PCD to the recipient user in a sound form. If the recipient user rejects the call, then establishing of the call session is interrupted (Substep 8057). Alternatively, if the recipient user accepts the call, the caller PCD of the caller voice communication domain is coupled (Substep 8058) to the recipient PCD of the recipient voice communication domain.

Turning back to FIG. 7, after establishing of the call session by the voice command of the caller user to the voice communication server 13, the server 13 provides (Step 78) a full-duplex exchange of user voice communication signals between the caller PCD and the recipient PCD via the voice communication server 13 during the call session. When desired, by either the caller user or the recipient user, the voice communication server 13 terminates (Step 79) the call session between the caller and the recipient PCDs 12.

If, during analyzing (Step 74) of the received voice information signal, the voice communication server 13 determines that the voice information signal is the call proposal voice signal, then the voice communication server 13 establishes (Step 75) the call session by delivering the voice call proposal to the recipient user.

As described hereinabove, the voice call proposal is an alternative way to establish the call session. It differs from establishing of the call session by the voice command to the voice communication server 13, because it enables delivering of the call proposal directly to the recipient user. Hence, the voice call proposal is delivered directly to the recipient user and is subsequently played by a caller voice on the recipient PCD instead of the ringing notification signal.

According to an embodiment of the present invention, establishing (Step 75) of the call session by the voice call proposal includes analyzing (Substep 7538), by the voice communication server 13, a received recipient user response signal to the voice call proposal generated by the recipient PCD, so as to determine the recipient user intention whether to accept or to reject the voice call proposal.

Accordingly, if the recipient user intention is determined as rejection of the voice call proposal, the voice communication server 13 interrupts (Step 77) establishing of the call session to cancel establishment of the call session.

According to an embodiment of the present invention, when the recipient user intention is determined as a rejection of the call session, interrupting (Step 77) of establishment of the call session between the caller and the recipient PCDs includes deleting the recipient response voice signal buffered by the voice communication server 13.

On the other hand, if the recipient user intention is determined as acceptance of the voice call proposal, the voice communication server 13 provides (Step 78) a full-duplex exchange of user voice communication signals between the caller PCD and the recipient PCD via the voice communication server 13 during the call session.

Figure 12:
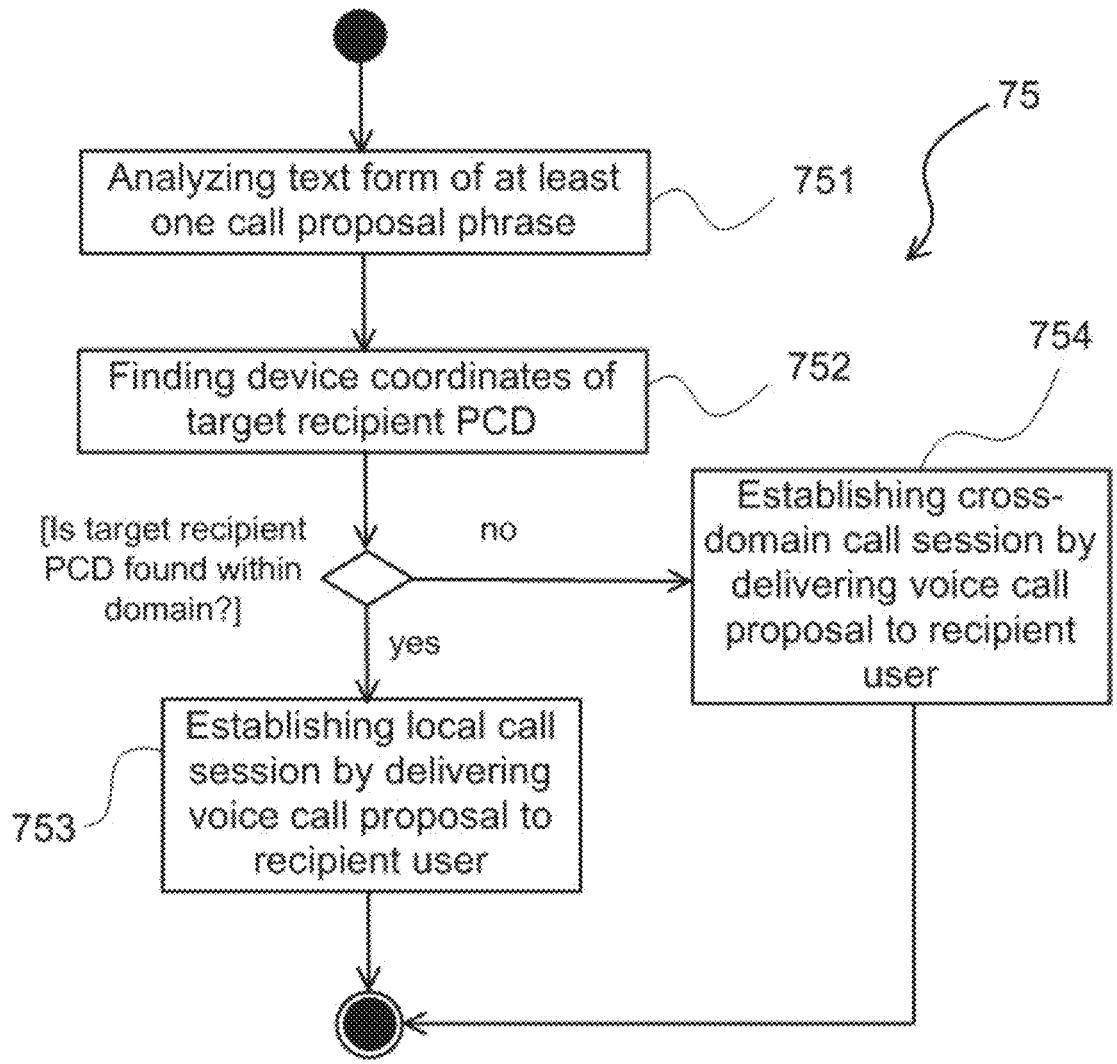
FIG. 12 illustrates a schematic flowchart diagram for establishing of the call session by delivering the voice call proposal to the recipient user of the method of FIG. 7, according to an embodiment of the present invention.

FIG. 12 illustrates a schematic flowchart diagram for establishing (Step 75) of the call session by delivering the voice call proposal to the recipient user of the method of FIG. 7, according to an embodiment of the present invention. Establishing (Step 75) of the call session by delivering the voice call proposal to the recipient user includes analyzing (Substep 751), by the voice communication server 13, the text form of the call proposal phrase(s) to determine personality characteristic(s) of the recipient user. Establishing (Step 75) of the call session by delivering the voice call proposal to the recipient user also includes finding (Substep 752), by the voice communication server 13, the device coordinates of the target recipient PCD in the domain communication network by using the personality characteristic(s) of the recipient user.

Hence, if the target recipient PCD is found within the voice communication domain, then the voice communication server 13 establishes (Substep 753) a local call session by delivering the voice call proposal to the recipient user located within the same domain. Alternatively, if the recipient PCD is located in another voice communication domain, then the voice communication server 13 establishes (Substep 754) the cross-domain call session by delivering the voice call proposal to the recipient user.

Figure 13:
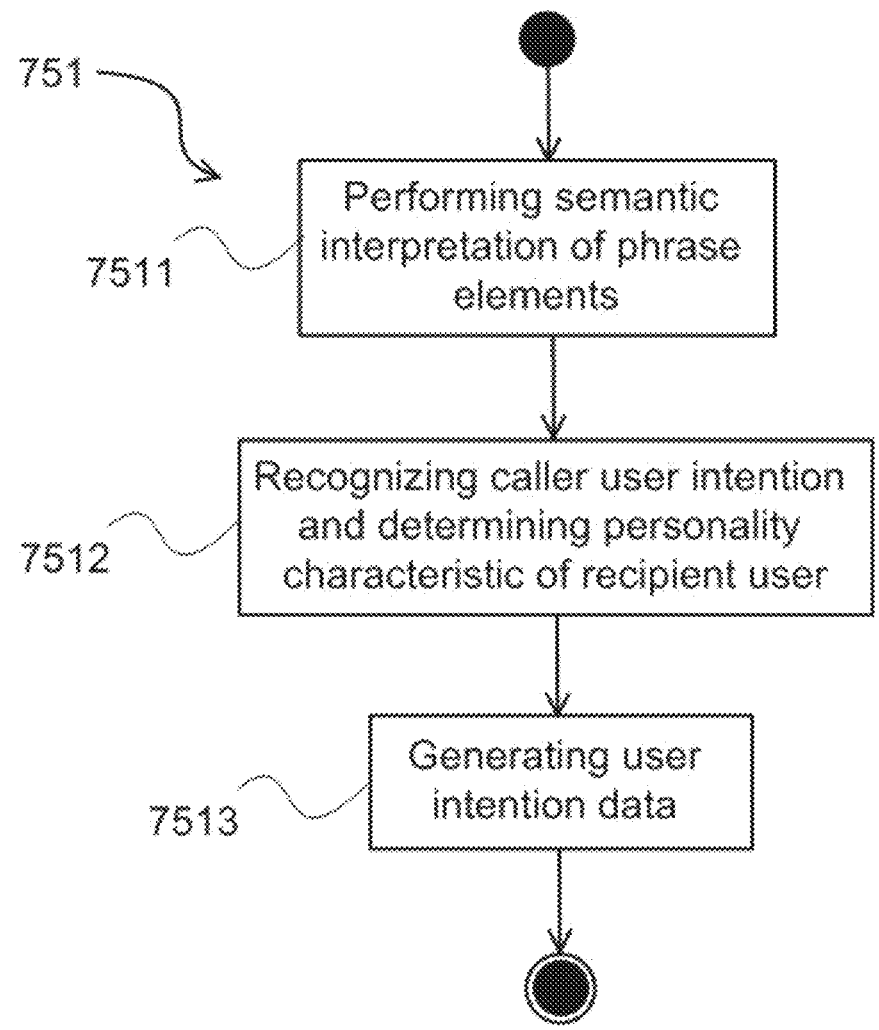
FIG. 13 illustrates a schematic flowchart diagram for analyzing of the text form of the call proposal phrase of the method of FIG. 12, according to an embodiment of the present invention.

Referring to FIG. 13, a schematic flowchart diagram for the analyzing (Substep 751 of FIG. 12), by the voice communication server, of the text form of the call proposal phrase is illustrated, according to an embodiment of the present invention. Analyzing (Substep 751), by the voice communication server 13, of the text form of said at least one call proposal phrase includes performing (Substep 7511) semantic interpretation of the phrase element(s). During semantic interpretation, the caller user intention to establish a call session is recognized (Substep 7512) and the personality characteristic(s) of the recipient user is determined from the semantically interpreted phrase elements. Analyzing of the text form of the call proposal phrase also includes generating (Substep 7513) user intention data including personality characteristic(s) of the recipient user with whom the caller user intends to establish the call session.

Figure 14:
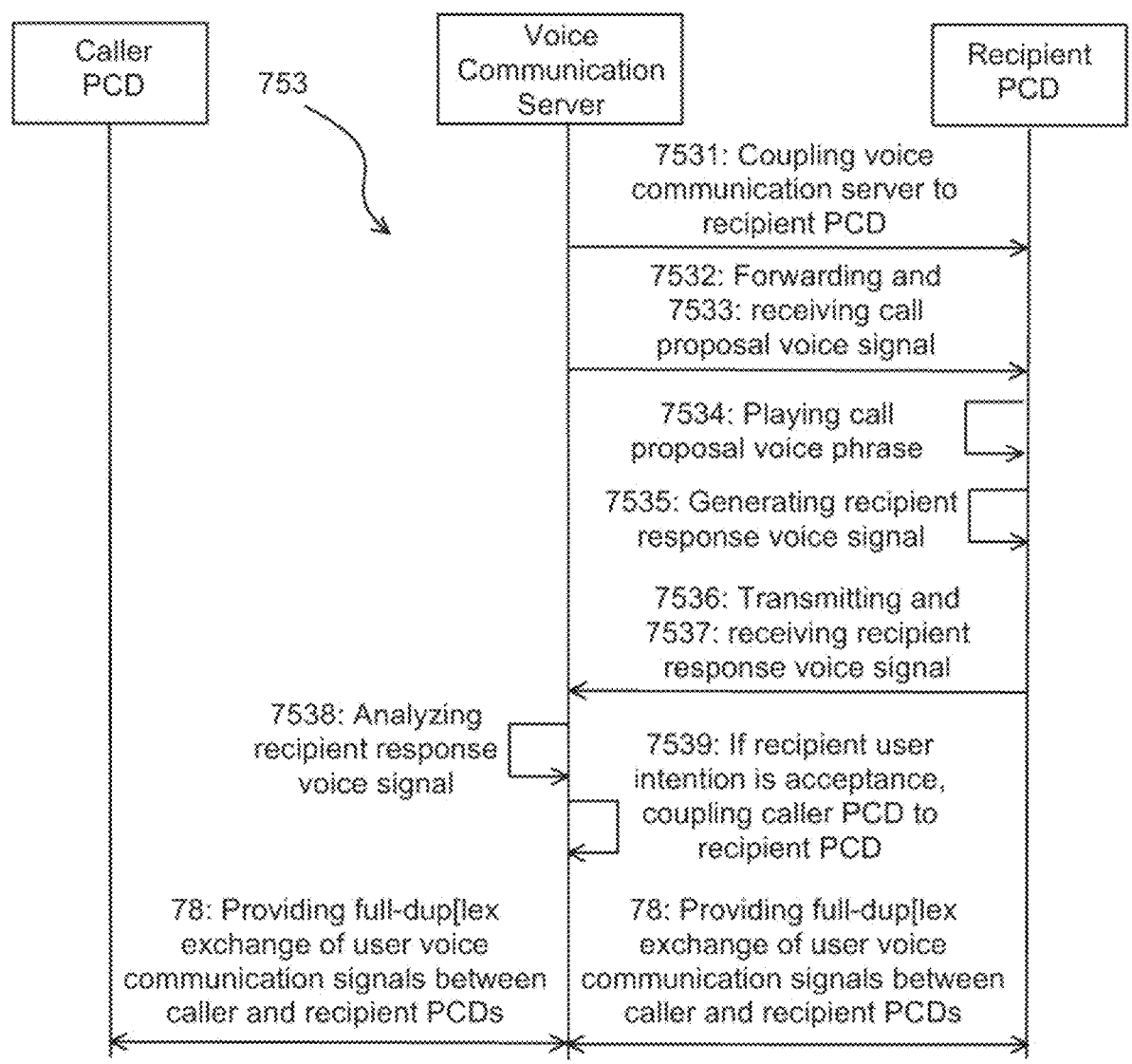
FIG. 14 illustrates a schematic sequence diagram for the establishing of the local call session by delivering the voice call proposal to the recipient user located within the same domain of the method of FIG. 12, according to an embodiment of the present invention.

FIG. 14 illustrates a schematic sequence diagram for the establishing (Substep 753 of FIG. 12) of the local call session by delivering the voice call proposal to the recipient user located within the same domain, according to an embodiment of the present invention. Establishing (Substep 753) of the local call session by delivering the voice call proposal to the recipient user located within the same domain includes coupling (Substep 7531) the voice communication server 13 to the recipient PCD by using the device coordinates of the recipient PCD and forwarding (Substep 7532), by the voice communication server 13, the call proposal voice signal to the recipient PCD. The call proposal voice signal is received (Substep 7533) by the recipient PCD and the corresponding call proposal voice phrase of the caller user is played (Substep 7534) to the recipient user on the recipient PCD. A recipient response voice signal that is indicative of the recipient reaction is generated (Substep 7535) by the recipient PCD and transmitted (Substep 7536) from the recipient PCD to the voice communication server 13. In turn, the voice communication server 13 receives (Substep 7537) the recipient response voice signal from the recipient PCD, and analyzes the recipient response voice signal (Substep 7538), so as to determine indication of the recipient user intention.

Hence, if the recipient user intention is determined as an acceptance of the call session, the voice communication server 13 couples (Substep 7539) the caller PCD to the recipient PCD and provides (Step 78 in FIG. 7) full duplex voice communication between the caller PCD and the recipient PCD located within the same caller voice communication domain.

According to an embodiment of the present invention, receiving (Substep 7537) of the recipient response voice signal from the recipient PCD, by the voice communication server 13, includes buffering a copy of the recipient response voice signal. This buffering is necessary for storing a copy of the recipient response voice signal during its analyzing (Substep 7538), and for making it possible to forward the buffered copy of the signal to the caller PCD as a part of the full duplex voice communication between the caller PCD and the recipient PCD (Step 78 in FIG. 7). Such forwarding is needed when the indication of the recipient user intention is determined as acceptance of the call session. Alternatively, when the recipient user intention is determined as rejection of the call session, the buffered copy of the signal is discarded and deleted.

Figure 15:
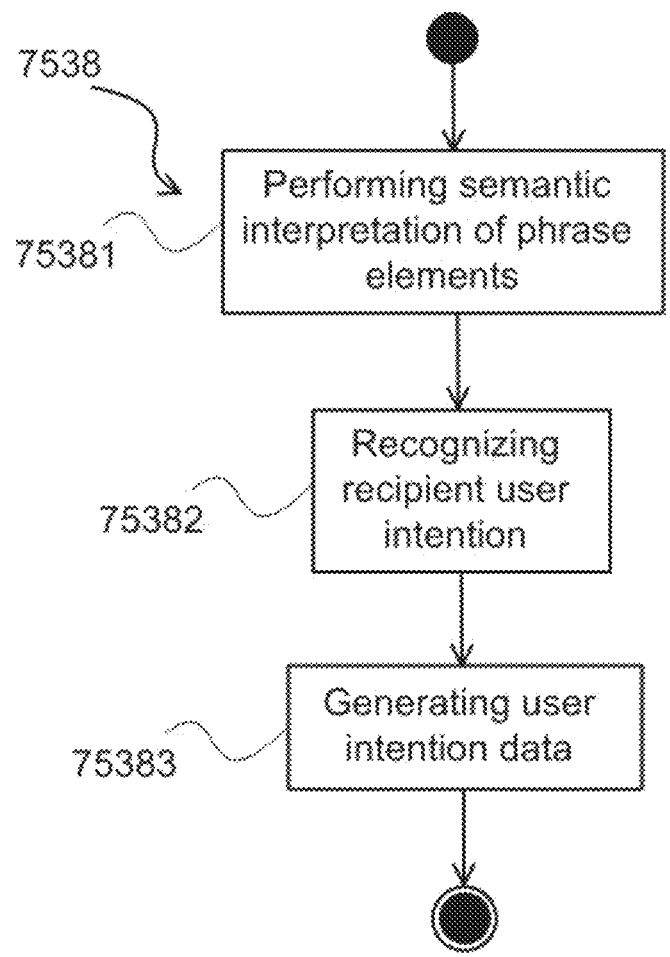
FIG. 15 illustrates a schematic flowchart diagram for the analyzing of the recipient response voice signal of the method of FIG. 14, according to an embodiment of the present invention.

FIG. 15 illustrates a schematic flowchart diagram for analyzing (Substep 7538 of FIG. 14), by the voice communication server (13 in FIG. 2), of the recipient response voice signal of the step, according to an embodiment of the present invention. Analyzing (Substep 7538) of the recipient response voice signal, by the voice communication server 13, includes performing (Substep 75381) semantic interpretation of said phrase elements and recognizing (Substep 75382) the recipient user intention either to accept or to reject the call session from the semantically interpreted phrase elements. After recognition of the recipient user intention, user intention data indicative of said recipient user intention are generated (Substep 75383).

Figure 16:
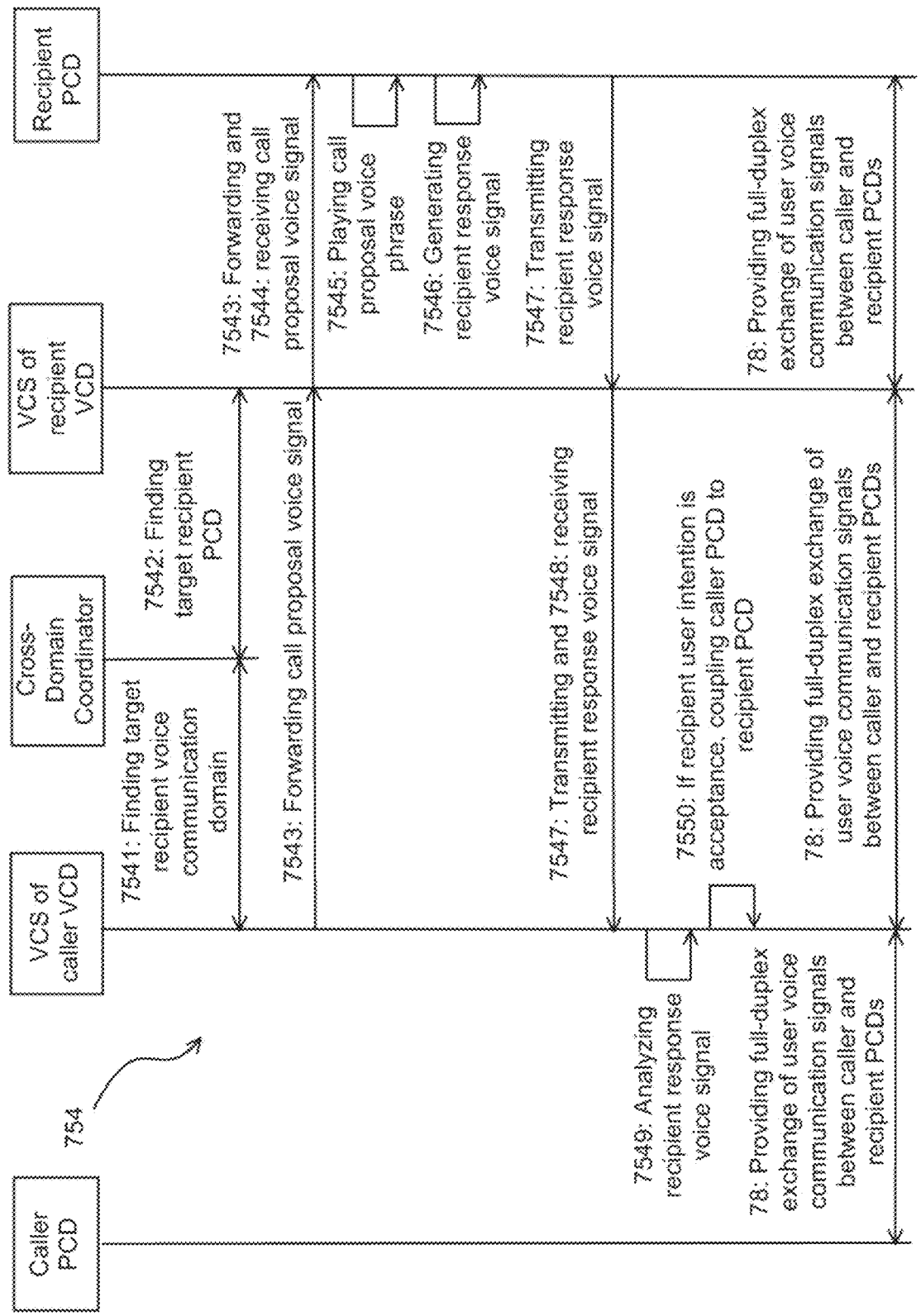
FIG. 16 illustrates a schematic sequence diagram for the establishing of the cross-domain call session by delivering the voice call proposal to the recipient user between the caller and recipient domains of the method of FIG. 12, according to an embodiment of the present invention.

Referring to FIG. 16, a schematic sequence diagram for the establishing (Substep 754 of FIG. 12) of the cross-domain call session between the caller and recipient domains by delivering the voice call proposal to the recipient user is illustrated, according to an embodiment of the present invention. The establishing (Substep 754 of FIG. 12) of the cross-domain call session includes finding (Substep 7541) a target recipient voice communication domain by exchanging the cross-domain coordination signals between the voice communication server of the caller voice communication domain and the cross-domain coordinator. Establishing of the cross-domain call session also includes finding (Substep 7542) the target recipient PCD within the recipient voice communication domain by exchanging the cross-domain coordination signals between the cross-domain coordinator and the voice communication server of the recipient voice communication domain. The call proposal voice signal is forwarded (Substep 7543) to the recipient PCD, by the voice communication server of the caller voice communication domain, via the voice communication server of the recipient voice communication domain. The call proposal voice signal is received (Substep 7544) by the recipient PCD, and the corresponding call proposal voice phrase of the caller user is played (Step 7545) to the recipient user.

In response to the call proposal voice phrase, a recipient response voice signal is generated (Substep 7546) by the recipient PCD, and transmitted (Substep 7547) from the recipient PCD to the voice communication server of the caller voice communication domain via the voice communication server of the recipient voice communication domain. The recipient response voice signal from the recipient PCD is received (Substep 7548) by the voice communication server of the caller voice communication domain, and analyzed (Substep 7549) by the voice communication server of the caller voice communication domain, so as to determine indication of the recipient user intention.

Accordingly, if the recipient user intention is determined as an acceptance of the call session, the caller PCD is coupled (Substep 7550) to the recipient PCD, and the full duplex voice communication is provided (Step 78 in FIG. 7) between the caller PCD located in the caller voice communication domain and the recipient PCD located in the recipient voice communication domain by exchanging the user voice communication signals between the caller voice communication domain and the recipient voice communication domains over the GCN.

Figure 17:
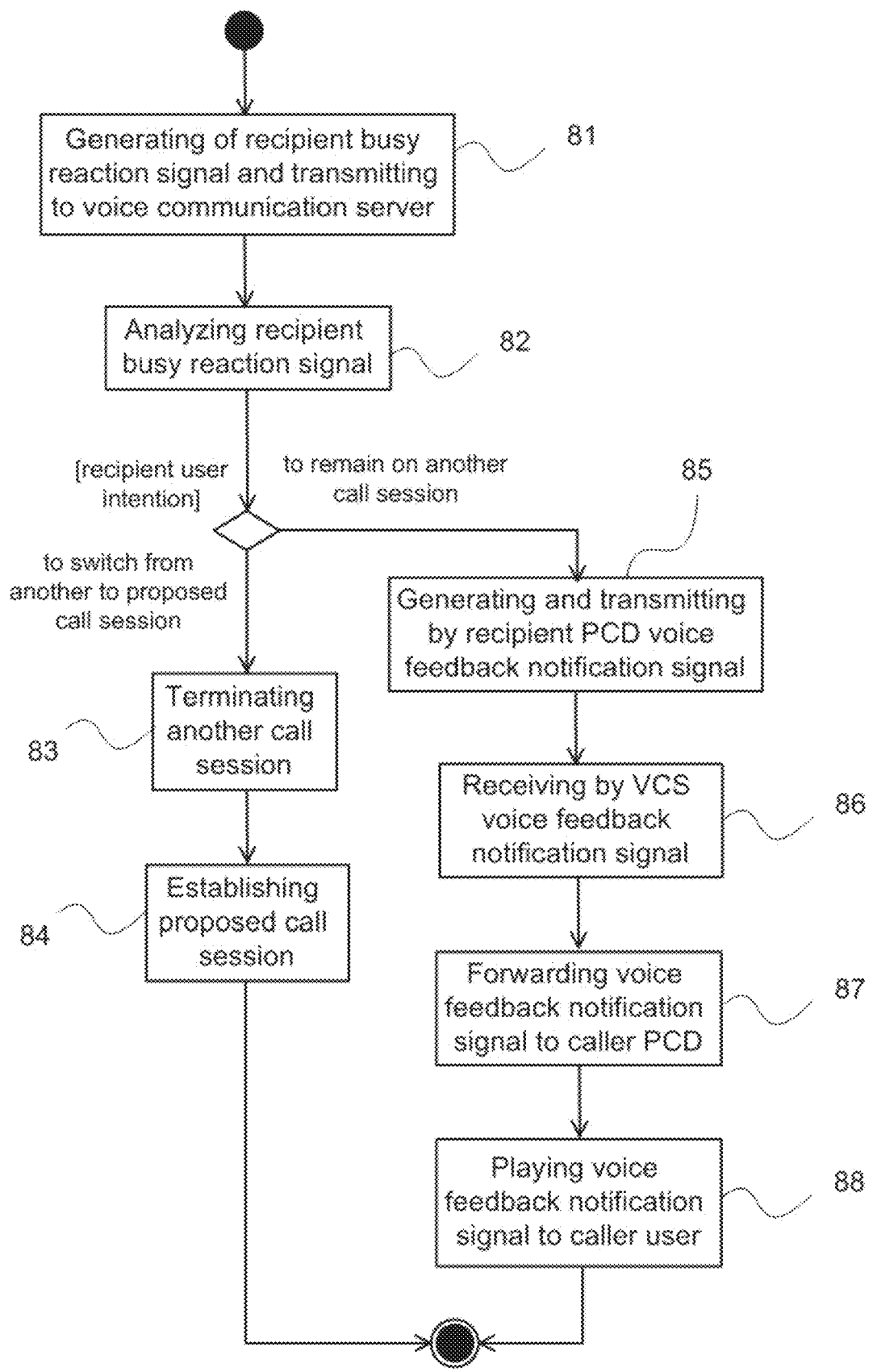
FIG. 17 illustrates a schematic flowchart diagram for the method scenario, when, during the step of the call session, establishing, by delivering the voice call proposal to the recipient user of the method of FIG. 7 the recipient PCD participates in another call session, according to an embodiment of the present invention.

FIG. 17 illustrates a schematic flowchart diagram for the scenario of the voice communication method when, during the call session establishing (Step 75 of FIG. 7) by delivering the voice call proposal to the recipient user, the recipient PCD participates in another call session, according to an embodiment of the present invention. In this case, the voice communication method includes generating and transmitting (Step 81) to the voice communication server 13, by the recipient PCD, a recipient busy reaction signal. The recipient busy reaction signal is indicative of the recipient user's intention whether to switch from the other call session to the proposed call session, or to remain on the other call session. The recipient busy reaction signal is analyzed (Step 82), by the voice communication server 13, so as to determine the intention of the recipient user, and if the determined recipient user's intention is to switch from the other call session to the proposed call session, the voice communication server 13 terminates (Step 83) the other call session, and establishes (Step 84) the proposed call session with the caller PCD. Alternatively, if the determined recipient user's intention is to remain on the other call session, a voice feedback notification signal is generated (Step 85) by the recipient PCD, and transmitted to voice communication server 13. The voice communication server 13 receives (Step 86) the voice feedback notification signal from the recipient PCD, and forwards (Step 87) the voice feedback notification signal to the caller PCD for playing (Step 88) the voice feedback notification to the caller user by a voice of the recipient user on the caller PCD.

Turning back to FIG. 7, when desired by either the caller user or the recipient user, the voice communication server 13 can terminate (Step 79) the call session between the caller and the recipient PCDs.

Figure 18:
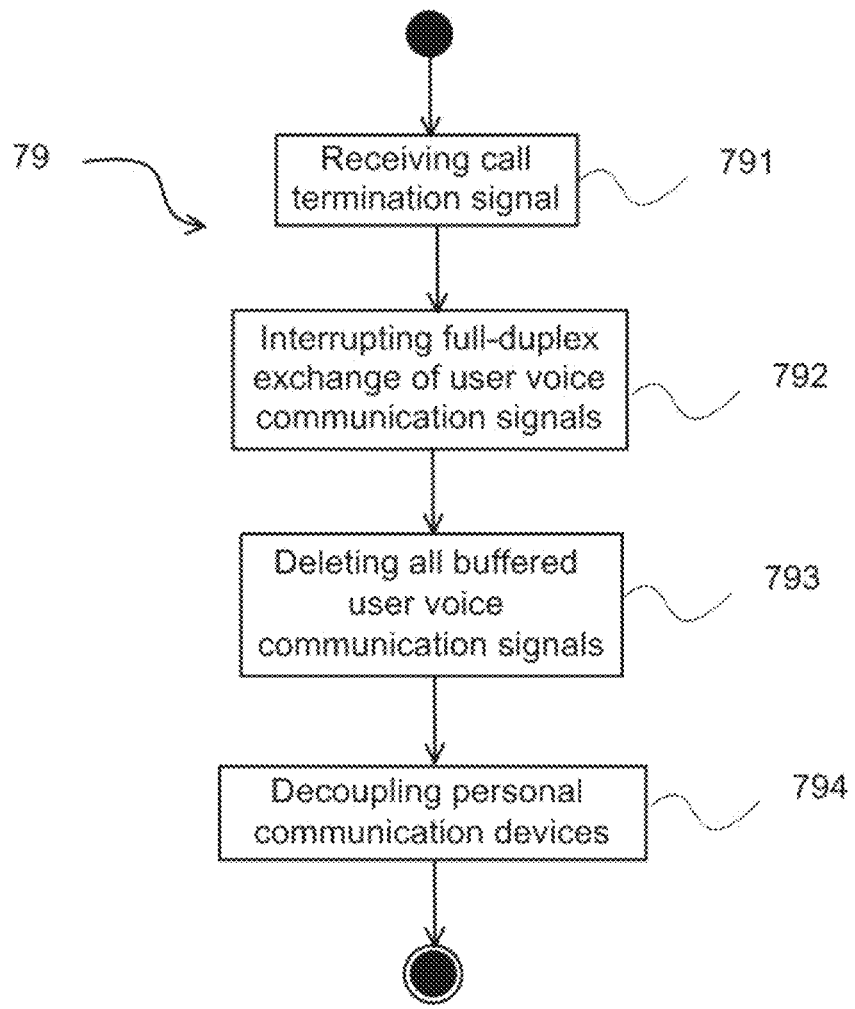
FIG. 18 illustrates a schematic flowchart diagram for terminating of the call session of the method of FIG. 7, according to an embodiment of the present invention.

FIG. 18 illustrates a schematic flowchart diagram for the terminating (Step 79 of FIG. 7) of the call session by the voice communication server (13 in FIG. 2), according to an embodiment of the present invention. Terminating of the call session includes receiving (Substep 791) a call termination signal from either the caller PCD or the recipient PCD participating in the established call session. The call termination signal is indicative of the intention of the corresponding participating user to terminate an ongoing call session. In response to the call termination signal, the voice communication server 13 terminates the established call session.

According to an embodiment of the present invention, terminating of the call session includes interrupting (Substep 792) the ongoing full-duplex exchange of user voice communication signals between the personal communication devices participating in the call session, deleting (Substep 793) all the buffered user voice communication signals, and decoupling (Substep 794) the personal communication devices participating in the terminated call session from the voice communication server (13 in FIG. 2).

As described hereinabove, the voice information signals generated by PCDs include (i) the call proposal voice signals, (ii) the recipient response voice signals, (iii) the voice command signals and (iv) the user voice communication signals by the sender and recipient PCDs. According to an embodiment of the present invention, generating of the voice information signals starts from receiving audio signals from a surrounding environment of the corresponding personal communication device. The received audio signals include all voice signals generated by the corresponding user of the PCD, collateral sound noise, and echo signals.

The voice signals are provided verbally by the PCD users and are selected from one of the following: call proposal phrase(s), recipient response phrase(s), voice command(s), and verbal speech of the users corresponding to voice communication of the caller user to other users.

Generating of the voice information signals also includes extracting the voice signals generated by the PCD user from the audio signals. During extraction, the collateral sound noise is suppressed, and the echo signals are cancelled. Generating of the voice information signals further includes encoding the extracted voice signals generated by the PCD users. Encoding of the extracted voice signals includes applying a voice codec to generate the call proposal voice signals, the recipient response voice signals, the voice command signals, and the user voice communication signals of the personal communication devices.

Turning back to FIG. 7, if the voice information signal is determined as the voice command signal indicative of a PCD control instruction of the user, the voice communication server (13 in FIG. 2) controls (Step 81) operation of the PCD and adjusts functionality of the PCD.

Figure 19:
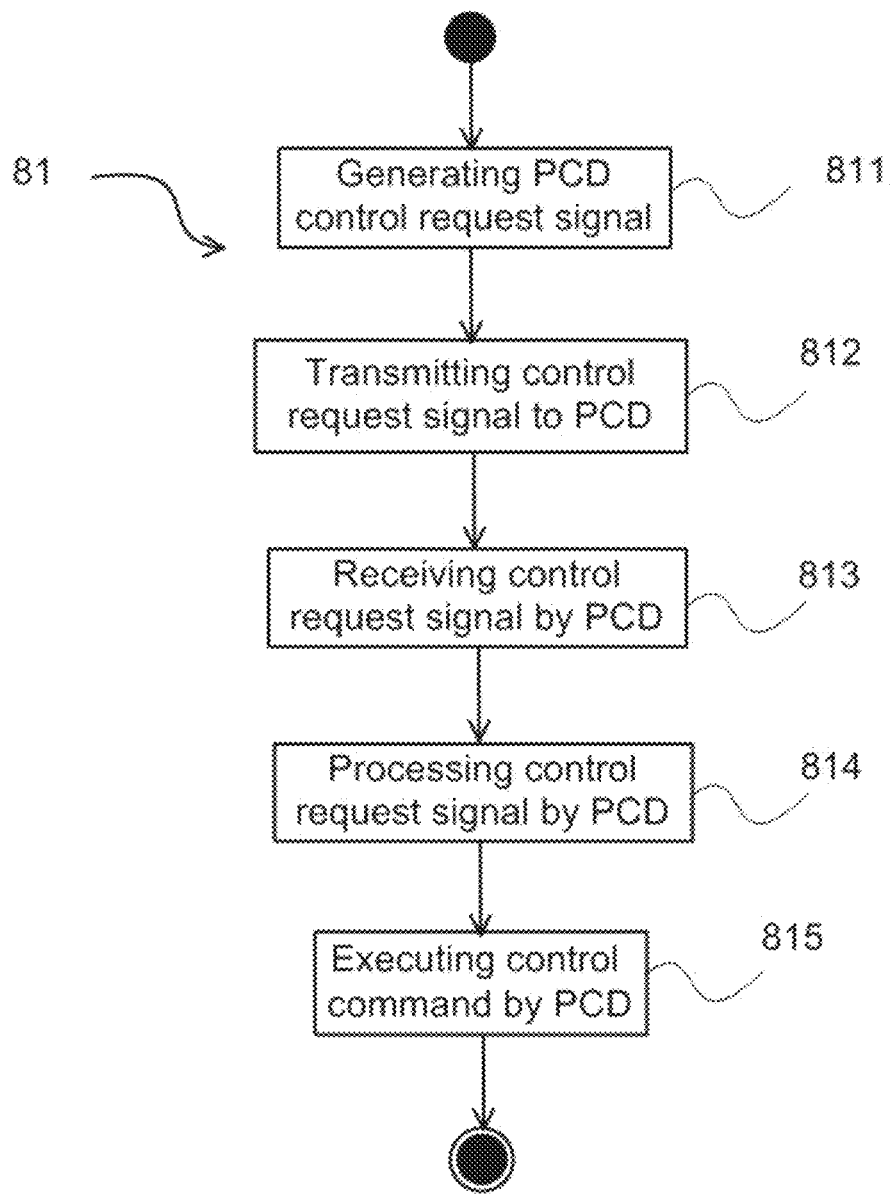
FIG. 19 illustrates a schematic flowchart diagram for controlling of the operation of the PCD of the method of FIG. 7, according to an embodiment of the present invention.

Referring to FIG. 19, a schematic flowchart diagram for the step of controlling operation of the PCD is illustrated, according to an embodiment of the present invention. Controlling (Step 81) of operation of the PCD by the voice communication server (13 in FIG. 2) includes generating (Substep 811) a PCD control request signal in accordance with a PCD control protocol by the voice communication server. The PCD control request signal carries a control command and corresponding parameters of the control command for coordination of functionality of the PCD. The control command is indicative of the corresponding PCD control instruction of the user voice command.

The PCD control request signal is transmitted (Substep 812) from the voice communication server to the PCD over the domain communication network, and is received (Substep 813) by the PCD. After receiving, the PCD control request signal is processed by the PCD (Substep 814) in accordance with the PCD control protocol to extract information about the control command, which the PCD needs to execute, and the corresponding parameters of the control command. The PCD executes (Substep 815) the control command, thereby adjusting operation of the PCD.

The PCD control instruction can, for example, be "Turn the volume up". In this example, the phrase element "Turn volume" is an instruction name denoting that the sound level of the audio output of the PCD device is required to be changed. The phrase element "up" is an instruction parameter, associated with the given control instruction. It indicates that the sound level needs to be increased by a predetermined value. Another example of a PCD control instruction can be "Do not disturb", where the phrase element "Do not disturb" is an instruction name denoting that the PCD device needs to be switched to the silent mode. It should be noted that there is no associated instruction parameter here.

Exchange of PCD control protocol signals can be implemented, for example, in accordance with a REST (Representational State Transfer) architectural style, a SOAP (Simple Object Access Protocol) based web services technology, or by using any other suitable technology.

As such, those skilled in the art to which the present invention pertains, can appreciate that while the present invention has been described in terms of preferred embodiments, the concept upon which this disclosure is based may readily be utilized as a basis for the designing of other structures, systems and processes for carrying out the several purposes of the present invention.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing any departure from the scope of the disclosure.

Also, it is to be understood that the phraseology and terminology employed herein are for the purpose of description and should not be regarded as limiting.

It should be noted that the words "comprising", "including" and "having" as used throughout the appended claims are to be interpreted to mean "including but not limited to".

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases, and disjunctively present in other cases.

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

The invention claimed is:

1. A voice communication system for providing call sessions between personal communication devices of a caller user and a recipient user of the system, the system comprising:
    one or more voice communication domains interacting with each other, each voice communication domain having a corresponding unique domain identifier (ID), and being configured to provide the call sessions between a caller user personal communication device and at least one recipient user personal communication device located within the same voice communication domain over a domain communication network, and to provide the call sessions between personal communication devices of the communicating users located in different domains over a Global Communication Network (GCN); and
    a cross-domain coordinator having at least one publicly accessible IP address in the Global Communication Network, and configured to coordinate interaction between the voice communication domains over the GCN by exchanging cross-domain coordination signals with the voice communication domains;
    each voice communication domain comprising:
        one or more personal communication devices (PCDs) associated with corresponding users, each PCD having unique coordinates in the domain communication network, and being configured to provide voice communication between the caller user and the recipient user within the same voice communication domain and between the caller user and the recipient user located in different voice communication domains; and
        a voice communication server (VCS) deployed within the voice communication domain and adapted for being coupled via communication links to each of the PCDs within the voice communication domain, the voice communication server being configured for:
            controlling operation of the PCDs by exchanging PCD control protocol signals with personal communication devices;
            providing call sessions between the caller and recipient PCDs within the same voice communication domain, the providing of the call sessions including establishing the call sessions, maintaining the call sessions, and terminating the call sessions between the caller and recipient PCDs, the providing of the call sessions between the caller and recipient PCDs within the same voice communication domain including exchanging voice information signals between the PCDs via the VCS within the same voice communication domain;
            coordinating the call session establishment between a caller PCD located in a caller voice communication domain and a target recipient PCD located in another recipient voice communication domain over the GCN, said coordinating of the call session establishment including:
                finding said another recipient voice communication domain within the voice communication system by exchanging the cross-domain coordination signals between the caller voice communication domain and the cross-domain coordinator,
                finding the target recipient PCD within said recipient voice communication domain by exchanging said cross-domain coordination signals between the cross-domain coordinator and the recipient voice communication domain,
                establishing the call session between the caller PCD located in the caller voice communication domain and the target recipient PCD located in said recipient voice communication domain by exchanging cross-domain communication control signals between the voice communication servers of the caller voice communication domain and the recipient voice communication domain, correspondingly, and
                providing full-duplex voice communication between the caller PCD located in the caller voice communication domain and the recipient PCD located in the recipient voice communication domain by exchanging the user voice communication signals between the caller voice communication domain and the recipient voice communication domain over the Global Communication Network;
    wherein each of said voice information signals is selected from the following types:
        (i) a voice command signal corresponding to at least one user command phrase provided verbally by the caller and recipient users, said at least one user command phrase being indicative of a user control instruction to control operation of the voice communication system, said at least one user command phrase including an instruction name and associated instruction parameters required for executing the user control instruction, the user control instruction being selected from a call session establishment instruction and a PCD control instruction;
        (ii) a call proposal voice signal indicative of at least one call proposal phrase uttered by the caller user, said at least one call proposal phrase indicative of the caller user intention to establish the call session, the call proposal phrase including at least one personality characteristic of the recipient user;

(iii) a recipient response voice signal indicative of a recipient user response phrase, said recipient user response phrase being indicative of the recipient user's intention to accept the call session or to reject the call session; and (iv) a user voice communication signal provided verbally by the caller and recipient users and corresponding to voice communication between the caller user and the recipient user during the call session, wherein the voice communication server is configured for analyzing each of said exchanged voice information signals, so as to determine a type of the signal, and if the type of the voice information signal is determined as the voice command signal, which is indicative of the call session establishment instruction of the caller user, then establishing the call session by a voice command of the caller user to the voice communication server to initiate the call session by forwarding a ringing notification signal to the recipient PCD, and if the type of the voice information signal is determined as the call proposal voice signal, which is indicative of the caller user intention to establish the call session, then initiating the call session by delivering the voice call proposal to the recipient user to establish the call session and subsequent playing the voice proposal by a voice of the caller user on the recipient PCD.

2. The voice communication system of claim 1, wherein the voice communication server of each voice communication domain comprises:

a communication interface comprising a network connector and a network communicator coupled to the network connector;

a voice utterance analyzer coupled to the network communicator of the communication interface;

a call proposal handler coupled to the voice utterance analyzer;

a voice command recognizer coupled to the voice utterance analyzer;

a control system coupled to the network communicator of the communication interface, to the call proposal handler and to the voice command recognizer, the control system comprising:
a VCS central controller coupled to the call proposal handler and to the voice command recognizer;
a PCD controller coupled to the VCS central controller and to the network communicator of the communication interface;
a call session controller coupled to the VCS central controller, and
a cross-domain communicator coupled to the VCS central controller and to the network communicator of the communication interface;

a voice traffic dispatcher coupled to the VCS central controller, to the call session controller and to the network communicator of communication interface, and a voice communication domain registry coupled to the VCS central controller;

wherein the network connector is configured to provide signal exchange of said voice information signals and said PCD control protocol signals between the voice communication server and personal communication devices associated with the users within the voice communication domain, and to provide exchange of (i) said cross-domain coordination signals between the voice communication server and the cross-domain controller, and (ii) said cross-domain communication control signals between the voice communication servers of different voice communication domains;

the network communicator is configured:
to provide signal exchange of said voice information signals, said PCD control protocol signals, said cross-domain coordination signals, said cross-domain communication control signals, in accordance with network protocols;
to relay said voice information signals to the voice utterance analyzer and to the voice traffic dispatcher,
to relay said PCD control protocol signals to the PCD controller,
to relay said cross-domain coordination signals to the cross domain communicator, and
to relay said cross-domain communication control signals to said cross domain communicator;

the voice utterance analyzer is configured:
to receive said voice information signals dispatched by the network communicator of the communication interface;
to convert the received voice information signals from speech to text form;
to provide syntactic analysis of the user phrases from the voice information signals, so as to determine the types of the voice information signals;
to separate the voice command signal, the call proposal signal, the recipient response signal, and the user voice communication signal from each other;
to relay the call proposal signal and the recipient response signal to the call proposal handler, and
to relay the voice command signal to the voice command recognizer;

the call proposal handler is configured:
to receive and to analyze said call proposal voice signal, so as to determine said at least one call proposal phrase, so as to determine the caller user's intention to establish the call session, and to determine said at least one personality characteristic of the recipient user,
to generate caller user intention data including said at least one personality characteristic of the recipient user, and
to provide the caller user intention data to the VCS central controller;
to analyze the recipient response voice signal, so as to recognize the recipient user intention selected from the recipient acceptance intention and the recipient rejection intention of the call session,
to generate recipient user intention data indicative of the recipient user intention, and
to provide said recipient user intention data to the VCS central controller;

the voice command recognizer is configured:
to receive the voice command signal from the voice utterance analyzer,
to analyze the command phrases represented by the voice command signal, so as to extract the instruction names and the associated parameters required for executing the user control instruction,
to generate voice command notification signals carrying the extracted instruction names, and the corresponding associated parameters, and to relay said generated voice command notification signals to the VCS central controller;

the VCS central controller is configured:

to receive the caller user intention data from the call proposal handler, the VCS central controller being responsive to said caller user intention data, and further configured:

to acquire device coordinates of the recipient PCD in the domain communication network from the voice communication domain registry by using said at least one personality characteristic of the recipient user, to generate a transmission command signal, said transmission command signal being indicative of the device coordinates of the recipient PCD, and to relay said transmission command signal to the voice traffic dispatcher, to receive the recipient user intention data from the call proposal handler, the VCS central controller being responsive to said recipient user intention data and further configured:

to analyze the recipient user intention data in order to determine whether the recipient user intends to accept a call session with the caller user or to reject the call session;

if the recipient user intends to accept the call session, then to generate a central controller session instruction signal to establish the call session, and to relay the central controller instruction signal to the call session controller; and if the recipient user intends to reject the call session, then to interrupt establishment of the call session between the caller and the recipient PCDs, to receive voice command notifications from said voice command recognizer, the VCS central controller being responsive to said voice command notifications to execute voice commands by generating central controller control instruction signals including said central controller session instruction signal and central controller PCD instruction signal, said central controller control instruction signals corresponding to said voice command notifications, and to relay said central controller session instruction signal to the call session controller, and to relay said central controller PCD instruction signal to the PCD controller, for execution;

the call session controller is configured:

to receive said central controller session instruction signal from the VCS central controller, the call session controller being responsive to said central controller session instruction signal to establish the call session between the caller PCD and the recipient PCD within the corresponding voice communication domain, and between the caller PCD and the recipient PCD of different voice communication domains, to generate a voice traffic exchange instruction signal during call session establishment, and to relay said generated voice traffic exchange instruction signal to the voice traffic dispatcher, and the PCD controller is configured to receive said central controller PCD instruction generated by said VCS central controller to control functionality of the personal communication devices by generating control request signals and transmitting said generated control request signals to the personal communication devices through the network communicator;

wherein the voice traffic dispatcher is configured to receive and buffer a call proposal voice signal from the communication interface, to receive the transmission instruction signal from the VCS central controller, the voice traffic dispatcher being responsive to said transmission instruction signal to forward the corresponding buffered call proposal voice signal to the recipient PCD via the communication interface, to receive and buffer the recipient response voice signal from the recipient PCD via the communication interface, to receive the voice traffic exchange instruction signal from the call session controller, the voice traffic dispatcher being responsive to said voice traffic exchange instruction signal and configured to forward the corresponding buffered recipient response voice signal to the caller PCD via the communication interface, and then to provide full-duplex exchange of user voice communication signals between the personal communication devices participating in the corresponding voice call session;

wherein the voice communication domain registry is configured for non-volatile storing and managing user information about the users of the personal communication devices, including at least one personal characteristic of the users, and device information about the personal communication devices, including device coordinates in the domain communication network of the corresponding domain, and providing said user information and said device information, in response to a corresponding request from the VCS central controller; and wherein the cross-domain communicator is configured to exchange said cross-domain coordination signals with cross-domain coordinator, and said cross-domain communication control signals with the voice communication server associated with another voice communication domain.

3. The voice communication system of claim 2, wherein said voice utterance analyzer comprises:

a speech to text converter coupled to the network communicator of the communication interface, and configured:

to receive the call proposal voice signal, the recipient response voice signal, and the voice command signal from the network communicator of the communication interface, to extract said at least one call proposal phrase uttered by the caller user from said call proposal voice signal and to convert said at least one call proposal phrase into a text form;

to extract said at least one recipient user response phrase uttered by the recipient user from said recipient response voice signal and to convert said at least one recipient user response phrase into a text form;

to extract said voice command phrase uttered either by the caller user or by the recipient user from said voice command signal and to convert said voice command phrase into a text form; and a syntactic analyzer coupled to the speech to text converter, to the call proposal handler, and to the voice command recognizer, and configured:

to provide syntactic analysis of the text forms of said at least one call proposal phrase, said at least one recipient user response phrase, and said voice command phrase, correspondingly, so as to decompose the phrases into corresponding interrelated phrase elements;
to separate said at least one call proposal phrase, said at least one recipient user response phrase, and the voice command phrase from each other,
to relay said at least one call proposal phrase and said at least one recipient user response phrase to the call proposal handler, and
to relay said voice command phrase to the voice command recognizer.

4. The voice communication system of claim 2, wherein said call proposal handler comprises:
a semantic interpreter coupled to the syntactic analyzer, and configured to receive said at least one call proposal phrase and said at least one recipient user response phrase from the syntactic analyzer, and to perform semantic interpretation of the phrase elements; and
a user intent recognizer coupled to the semantic interpreter, and to the VCS central controller, said user intent recognizer configured for:
recognizing the caller user and the recipient user intentions from semantically interpreted phrase elements of said at least one call proposal phrase and said at least one recipient user response phrase;
extracting said at least one personality characteristic of the recipient user from said call proposal phrase elements;
generating user intention data including said at least one personality characteristic of the recipient user corresponding to the at least one call proposal phrase and user intention data indicative of the recipient user intentions corresponding to said at least one recipient user response phrase, and
providing said generated user intention data to the VCS central controller.

5. The voice communication system of claim 1, wherein the cross-domain coordinator comprising:
a network connector configured to provide signal exchange of said cross-domain coordination signals over the GCN between said cross domain coordinator and a plurality of voice communication servers of the corresponding voice communication domains, said cross-domain coordination signals including domain registration signals, user registration signals and user discovery signals;
an IP network communicator coupled to said network connector, and configured to provide signal exchange of said cross-domain coordination signals between the cross domain coordinator and said plurality of voice communication servers associated with the corresponding voice communication domains in accordance with TCP/IP protocols;
a cross-domain coordination protocol handler coupled to the IP network communicator, and configured to exchange said cross-domain coordination signals between the cross domain coordinator and said plurality of voice communication servers associated with the corresponding voice communication domains in accordance with the cross-domain coordination protocol;
a system registrator coupled to said cross-domain coordination protocol handler, and configured to register the voice communication domains and the users associated with said corresponding voice communication domains;
a discovery engine coupled to said cross-domain coordination protocol handler, and configured to search the user information about the users registered by the system registrator and the corresponding voice communication domains;
a central registry coupled to the system registrator and to the discovery engine, and configured to provide non-volatile storage of domain information of the voice communication domains registered within the voice communication system, and the user information of the users registered within the voice communication system and associated with the corresponding voice communication domains.

6. The voice communication system of claim 2, wherein the communication interface is further configured:
to receive a recipient response action signal from the personal communication device of the recipient user, said recipient response action signal being indicative of a recipient user action pattern, said recipient user action pattern being indicative of a recipient user intention selected from a recipient acceptance intention and a recipient rejection intention of the call session; and
to forward said received recipient response action signal to the VCS central controller, the VCS central controller being further configured to analyze said recipient response action signal in order to determine the indicated recipient user intention and to initiate establishment of a corresponding call session if the recipient user intention is a recipient acceptance intention.

7. The voice communication system of claim 2, wherein the communication interface is further configured:
to receive a call termination signal from one of the personal communication devices participating in the established call session, said call termination signal being indicative of an intention of the corresponding participating user to terminate an ongoing call session, and
to forward said received call termination signal to the call session controller via the PCD controller and the VCS central controller, said call session controller being further configured to terminate said ongoing call session by generating a voice traffic interrupting signal and providing said voice traffic interrupting signal to the voice traffic dispatcher, the voice traffic dispatcher being further configured to interrupt the ongoing full-duplex exchange of user voice communication signals between the personal communication devices participating in the call session, and to delete all buffered user voice communication signals, in response to said voice traffic interrupting signal, and
to decouple the personal communication devices participating in the terminated call session from the voice communication server.

8. The voice communication system of claim 2, wherein the communication interface is further configured:
to receive a system activation signal followed by the call proposal voice signal provided by the personal communication device of the caller user;
to forward said received system activation signal to the VCS central controller via the PCD controller; and
to forward said received call proposal voice signal to the voice utterance analyzer and to the voice traffic dispatcher; the VCS central controller being responsive to said system activation signal, and configured to generate an utterance analyzing instruction signal and to provide said utterance analyzing instruction signal to the call proposal handler and to the voice utterance analyzer, thereby instructing the call proposal handler and the voice utterance analyzer to begin analyzing of the call proposal voice signal; the call proposal handler and the voice utterance analyzer being responsive to said utterance analyzing instruction signal and configured to begin analyzing the call proposal voice signal followed by the system activation signal.

9. The voice communication system of claim 2, wherein the voice communication server further comprises an external voice system controller coupled to the network communicator of the communication interface and to the VCS central controller; said external phone system controller being configured to receive external voice communication control instruction signals from the VCS central controller, and to coordinate communication of the voice communication server with external voice communication systems in response to said external voice communication control instruction signals; and the VCS central controller being further configured to generate and to relay said external voice communication control instruction signals to the external phone system controller.

10. The voice communication system of claim 9, wherein the voice communication domain further comprises a phone system gateway coupled to said external voice system controller of the voice communication server, to mobile phone systems and to public switched telephone networks: said external voice system controller is configured to coordinate the operation of the phone system gateway for exchanging voice traffic signals and communication control signals between the voice communication server and the mobile phone systems, and between the voice communication server and the public switched telephone networks (PSTN) in accordance with mobile and PSTN communication protocols, correspondingly.

11. The voice communication system of claim 9, wherein the voice communication domain further comprises a handheld radio transceiver gateway coupled to said external voice system controller of the voice communication server, and to at least one handheld radio transceiver device; said external voice system controller is configured to coordinate the operation of the handheld radio transceiver gateway for exchanging voice traffic signals and communication control signals between the voice communication server and the at least one handheld radio transceiver device in accordance with communication protocols supported by the corresponding at least one handheld radio transceiver device.

12. A voice communication method for providing call sessions between personal communication devices of caller users and recipient users for the system of claim 1, comprising:
generating a voice information signal by a caller PCD, said voice information signal selected from a voice command signal indicative of the call session establishment control instruction and a call proposal voice signal indicative of the caller user intention to establish the call session;
transmitting said voice information signal from the caller PCD to the voice communication server of the voice communication domain;
receiving said voice information signal by the voice communication server;
analyzing of the received voice information signal, by the voice communication server, so as to determine the selected type of voice information signal;
if the voice information signal is determined as the voice command signal indicative of a call session establishment instruction, establishing the call session by a voice command of the caller user to initiate the call session by ringing a notification sound signal on the recipient PCD, and providing a full-duplex exchange of user voice communication signals between the caller PCD and the recipient PCD via the voice communication server during the call session; and terminating of the call session between the caller and the recipient PCDs by either the caller user or the recipient user when desired;
if the voice information signal is determined as the call proposal voice signal, establishing the call session by delivering the voice call proposal to the recipient user to establish the call session, with subsequent playing the voice call proposal by a caller voice on the recipient PCD, said establishing of the call session includes receiving and analyzing, by the voice communication server, a recipient user reaction signal to the voice call proposal generated by the recipient PCD, so as to determine the recipient user intention whether to accept or to reject the voice call proposal, and
if the recipient user intention is determined as rejection of the voice call proposal, interrupting establishment of the call session by the voice communication server to cancel establishment of the call session;
if the recipient user intention is determined as acceptance of the voice call proposal, providing a full-duplex exchange of user voice communication signals between the caller PCD and the recipient PCD via the voice communication server during the call session; and terminating of the call session between the caller and the recipient PCDs by either the caller user or the recipient user when desired;
if the voice information signal is determined as the voice command signal indicative of a PCD control instruction, controlling the operation of the caller PCD by the voice communication server.

13. The voice communication method of claim 12, wherein the analyzing of the received voice information signal by the voice communication server comprises:
extracting at least one call proposal phrase uttered by the caller user from said call proposal voice signal and converting said at least one call proposal phrase into a text form;
extracting said voice command phrase uttered by the caller user from said voice command signal and converting said voice command phrase into a text form;
providing syntactic analysis of the text forms of said at least one call proposal phrase, and said voice command phrase, correspondingly, so as to decompose the phrases into corresponding phrase elements;
determining the type of the voice information signal to which each corresponding decomposed phrase belongs by analyzing the phrase elements for each decomposed phrase;
separating said at least one call proposal phrase, and the voice command phrase from each other on the basis of the determined types of the voice information signal.

14. The voice communication method of claim 13, wherein the determining of the type of the voice information signal comprises:
analyzing whether said phrase elements of the decomposed phrase correspond to an instruction name list including predetermined names for the control instructions assigned for the system for establishment of call sessions;
if the correspondence of the voice phrase elements to the instruction name list is found, then the type of the voice information signal is determined as of the voice command signal;

if the correspondence is not found, then finding and extracting said at least one personality characteristic of the recipient user from the voice phrase elements; and if said at least one personality characteristic of the recipient user is found in the voice phrase elements, then the type of the voice information signal is determined as the call proposal voice signal.

15. The voice communication method of claim 14, wherein if the type of the voice information signal was not determined, then generating, by the voice communication server, an unrecognition notification signal for the caller user, and transmitting said unrecognition notification signal to the personal communication device of the caller user; thereby to inform the caller user that the voice information signal from the caller PCD was not recognized.

16. The voice communication method of claim 12, wherein the establishing of the call session by delivering the voice call proposal to the recipient user, comprises:

analyzing, by the voice communication server, the text form of said at least one call proposal phrase to determine said at least one personality characteristic of the recipient user;

finding, by the voice communication server, the device coordinates of the target recipient PCD in the domain communication network by using said at least one personality characteristic of the recipient user; and if the target recipient PCD is found within the voice communication domain, establishing a local call session by delivering the voice call proposal to the recipient user located within the same domain; alternatively:

if the recipient PCD is located in another voice communication domain, establishing the cross-domain call session by delivering the voice call proposal to the recipient user.

17. The voice communication method of claim 16, wherein the establishing of the local call session by delivering the voice call proposal to the recipient user located within the same domain includes:

coupling the voice communication server to the recipient PCD by using the device coordinates, forwarding, by the voice communication server, the call proposal voice signal to the recipient PCD, receiving the call proposal voice signal by the recipient PCD and playing the corresponding call proposal voice phrase of the caller user to the recipient user on the recipient PCD, generating a recipient response voice signal by the recipient PCD, transmitting the recipient response voice signal from the recipient PCD to the voice communication server, receiving the recipient response voice signal from the recipient PCD by the voice communication server, analyzing the recipient response voice signal by the voice communication server, so as to determine indication of the recipient user intention, if the recipient user intention is determined as an acceptance of the call session, coupling the caller PCD to the recipient PCD and providing the full duplex voice communication between the caller PCD and the recipient PCD located within the same caller voice communication domain.

18. The voice communication method of claim 16, wherein the establishing of the cross-domain call session by delivering the voice call proposal to the recipient user between the caller and recipient domains, comprises;

finding a target recipient voice communication domain by exchanging the cross-domain coordination signals between the voice communication server of the caller voice communication domain and the cross-domain coordinator;

finding the target recipient PCD within the recipient voice communication domain by exchanging the cross-domain coordination signals between the cross-domain coordinator and the voice communication server of the recipient voice communication domain;

forwarding the call proposal voice signal to the recipient PCD by the voice communication server of the caller voice communication domain, via the voice communication server of the recipient voice communication domain;

receiving the call proposal voice signal by the recipient PCD and playing the corresponding call proposal voice phrase of the caller user to the recipient user;

generating a recipient response voice signal by the recipient PCD;

transmitting the recipient response voice signal from the recipient PCD to the voice communication server of the caller voice communication domain via the voice communication server of the recipient voice communication domain;

receiving the recipient response voice signal from the recipient PCD by the voice communication server of the caller voice communication domain;

analyzing the recipient response voice signal, by the voice communication server of the caller voice communication domain, so as to determine indication of the recipient user intention;

if the recipient user intention is determined as an acceptance of the call session, coupling the caller PCD to the recipient PCD, and providing the full duplex voice communication between the caller PCD located in the caller voice communication domain and the recipient PCD located in the recipient voice communication domain by exchanging the user voice communication signals between the caller voice communication domain and the recipient voice communication domains over the GCN.

19. The voice communication method of claim 17, wherein the receiving of the call proposal voice signal from the caller PCD, and the receiving of the recipient response voice signal from the recipient PCD, by the voice communication server, includes buffering a copy of said call proposal voice signal and said recipient response voice signal correspondingly.

20. The voice communication method of claim 16, wherein the analyzing, by the voice communication server, of the text form of said at least one call proposal phrase includes:

performing semantic interpretation of said phrase elements;

recognizing the caller user intention to establish a call session and determining said at least one personality characteristic of the recipient user from the semantically interpreted phrase elements; and generating user intention data including said at least one personality characteristic of the recipient user with whom the caller user intends to establish the call session.

21. The voice communication method of claim 17, wherein the analyzing of the recipient response voice signal, by the voice communication server, includes:

performing semantic interpretation of said phrase elements;

recognizing the recipient user intention either to accept or to reject the call session from the semantically interpreted phrase elements; and generating user intention data indicative of said recipient user intention.

22. The voice communication method of claim 19, wherein the interrupting of the establishing of the call session between the caller and the recipient PCDs when the recipient user intention is determined as a rejection of the call session, includes deleting the recipient response voice signal buffered by the voice communication server.

23. The voice communication method of claim 12, wherein if, during call session establishing by delivering the voice call proposal to the recipient user, the recipient PCD participates in another call session, the method including:

generating and transmitting to the voice communication server, by the recipient PCD, a recipient busy reaction signal, said recipient busy reaction signal is indicative of the recipient user intention whether to switch from said another call session to the proposed call session, or to remain on said another call session; and analyzing said recipient busy reaction signal, by the voice communication server, so as to determine the intention of the recipient user; and if the determined recipient user intention is to switch from said another call session to the proposed call session, terminating, by the voice communication server said another call session, and establishing the proposed call session with the caller PCD;

if the determined recipient user intention is to remain on said another call session, carrying out the steps of:

generating, by the recipient PCD, a voice feedback notification signal and transmitting the voice feedback notification signal to voice communication server;

receiving, by the voice communication server, from the recipient PCD, the voice feedback notification signal; and forwarding, by the voice communication server, the voice feedback notification signal to the caller PCD for playing the voice feedback notification to the caller user by a voice of the recipient user on the caller PCD.

24. The voice communication method of claim 12, wherein the establishing the call session by the voice command comprises:

analyzing the voice command phrase by the voice communication server to extract the user control instruction including instruction name and associated instruction parameters from the voice command phrase;

executing said user control instruction by the voice communication server, so as to establish the call session with the recipient PCD, the establishing of the call session including:

finding, by the voice communication server, the device coordinates of the recipient PCD in the domain communication network by using said associated instruction parameters;

if the recipient PCD is found within the same voice communication domain, establishing the local call session by ringing a notification sound signal on the recipient PCD, if the recipient PCD is located in another voice communication domain, establishing the cross-domain call session by ringing a notification sound signal on the recipient PCD.

25. The voice communication method of claim 24, wherein the establishing the local call session by ringing a notification sound signal on the recipient PCD comprises:

coupling the voice communication server to the recipient PCD by using the device coordinates;

generating the ringing notification signal by the voice communication server;

transmitting a ringing notification signal to the recipient PCD; and playing said ringing notification by the recipient PCD to the recipient user in a sound form;

if the recipient user rejects the call, interrupting of the establishing of the call session;

if the recipient user accepts the call, coupling the caller PCD to the recipient PCD.

26. The voice communication method of claim 24, wherein the establishing the cross-domain call session by ringing a notification sound signal on the recipient PCD comprises:

to finding a target recipient voice communication domain by exchanging the cross-domain coordination signals between the caller voice communication domain and the cross-domain coordinator;

finding the target recipient PCD within the recipient voice communication domain by exchanging the cross-domain coordination signals between the cross-domain coordinator and the recipient voice communication domain;

coupling the voice communication server of the recipient voice communication domain to the recipient PCD, generating the ringing notification signal by the voice communication server of the recipient voice communication domain, transmitting ringing notification signal to the recipient PCD, and playing said ringing notification by the recipient PCD to the recipient user in a sound form, if the recipient user rejects the call, interrupting of the establishing of the call session;

if the recipient user accepts the call, coupling the caller PCD of the caller voice communication domain to the recipient PCD of the recipient voice communication domain.

27. The voice communication method of claim 17, wherein the generating of the voice information signals including the call proposal voice signals, the recipient response voice signals, the voice command signals and the user voice communication signals by sender and recipient PCDs, comprises:

receiving audio signals from a surrounding environment of the personal communication device, said audio signals including:

voice signals generated by the users of the PCD, said voice signals being provided verbally by the users, and being selected from: at least one call proposal phrase, at least one recipient response phrase, at least one voice command, and verbal speech of the users corresponding to voice communication of the caller user to other users;

collateral sound noise; and echo signals:

extracting said voice signals generated by the PCD users from said audio signals by suppressing the collateral sound noise and cancelling the echo signals; and encoding the extracted voice signals generated by the PCD users by applying a voice codec to generate the call proposal voice signals, the recipient response voice signals, the voice command signals and the user voice communication signals of the personal communication devices.

28. The voice communication method of claim 12, wherein the terminating of the call session comprises:
receiving a call termination signal from one of the personal communication devices participating in the established call session, said call termination signal being indicative of the intention of the corresponding participating user to terminate an ongoing call session, and in response to said call termination signal, terminating the established call session; said terminating including:
interrupting the ongoing full-duplex exchange of user voice communication signals between the personal communication devices participating in the call session;
deleting all the buffered user voice communication signals; and
decoupling the personal communication devices participating in the terminated call session from the voice communication server.

29. The voice communication method of claim 12, wherein the controlling of operation of the PCD by the voice communication server comprises:
generating a PCD control request signal in accordance with a PCD control protocol by the voice communication server, said PCD control request signal carrying a control command and corresponding parameters of the control command for coordination of functionality of the PCD, the control command being indicative of the corresponding PCD control instruction of the user voice command;
transmitting said PCD control request signal from the voice communication server to said PCD over the domain communication network;
receiving said PCD control request signal by said PCD and processing said PCD control request signal in accordance with the PCD control protocol to extract information about the control command that the PCD needs to execute and the corresponding parameters of the control command; and
executing said control command by the PCD, thereby adjusting operation of the PCD.

* * * * *